United States Patent
Hare et al.

(10) Patent No.: US 12,211,159 B2
(45) Date of Patent: *Jan. 28, 2025

(54) 3D OBJECT CAMERA CUSTOMIZATION SYSTEM

(71) Applicant: Snap Inc., Santa Monica, CA (US)

(72) Inventors: Samuel Edward Hare, Los Angeles, CA (US); Andrew James McPhee, Culver City, CA (US); Maxim Maximov Lazarov, Culver City, CA (US); Wentao Shang, Los Angeles, CA (US); Kyle Goodrich, Venice, CA (US); Tony Mathew, Irvine, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,577

(22) Filed: Oct. 16, 2023

(65) Prior Publication Data
US 2024/0037878 A1    Feb. 1, 2024

Related U.S. Application Data

(63) Continuation of application No. 17/817,491, filed on Aug. 4, 2022, now Pat. No. 11,823,341, which is a
(Continued)

(51) Int. Cl.
*G06T 19/00* (2011.01)
*G06T 19/20* (2011.01)
(Continued)

(52) U.S. Cl.
CPC ............ *G06T 19/006* (2013.01); *G06T 19/20* (2013.01); *H04L 51/04* (2013.01); *H04N 5/272* (2013.01);
(Continued)

(58) Field of Classification Search
None
See application file for complete search history.

(56) References Cited

U.S. PATENT DOCUMENTS 5,751,850 A    5/1998  Rindtorff
5,880,731 A    3/1999  Liles et al.
(Continued)

FOREIGN PATENT DOCUMENTS

CA    2887596 A1    7/2015
CN    102609954 A    7/2012
(Continued)

OTHER PUBLICATIONS

US 10,964,114 B2, 03/2021, Hare et al. (withdrawn)
(Continued)

*Primary Examiner* — Ryan M Gray
(74) *Attorney, Agent, or Firm* — Schwegman Lundberg & Woessner, P.A.

(57) ABSTRACT

Systems and methods are provided for capturing by a camera of a user device, a first image depicting a first environment of the user device; overlaying a first virtual object on a portion of the first image depicting the first environment; modifying a surface of the first virtual object using content captured by the user device; storing a second virtual object comprising the first virtual object with the
(Continued)

modified surface; and generating for display the second virtual object on a portion of a second image depicting a second environment.

20 Claims, 15 Drawing Sheets

Related U.S. Application Data continuation of application No. 17/249,092, filed on Feb. 19, 2021, now Pat. No. 11,443,491, which is a continuation of application No. 16/457,461, filed on Jun. 28, 2019, now Pat. No. 11,189,098.

(51) Int. Cl.
*H04L 51/04* (2022.01)
*H04N 5/272* (2006.01)
*H04N 23/90* (2023.01)

(52) U.S. Cl.
CPC ......... *H04N 23/90* (2023.01); *G06T 2200/24* (2013.01); *G06T 2219/2016* (2013.01)

(56) References Cited

U.S. PATENT DOCUMENTS

| | | |
|---|---|---|
| 6,020,891 A | 2/2000 | Rekimoto |
| 6,023,270 A | 2/2000 | Brush, II et al. |
| 6,031,549 A | 2/2000 | Hayes-roth |
| 6,038,295 A | 3/2000 | Mattes |
| 6,157,342 A | 12/2000 | Okude et al. |
| 6,223,165 B1 | 4/2001 | Lauffer |
| 6,434,277 B1 | 8/2002 | Yamada et al. |
| 6,597,730 B1 | 7/2003 | Bader |
| 6,772,195 B1 | 8/2004 | Hatlelid et al. |
| 6,842,779 B1 | 1/2005 | Nishizawa |
| 6,867,787 B1 | 3/2005 | Shimizu et al. |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,553,032 B1 | 10/2013 | Poston |
| 8,559,980 B2 | 10/2013 | Pujol |
| 8,564,621 B2 | 10/2013 | Branson et al. |
| 8,564,710 B2 | 10/2013 | Nonaka et al. |
| 8,570,343 B2 | 10/2013 | Halstead |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,031,809 B1 | 5/2015 | Kumar et al. |
| 9,040,574 B2 | 5/2015 | Wang et al. |
| 9,055,416 B2 | 6/2015 | Rosen et al. |
| 9,058,757 B2 | 6/2015 | Bala et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,430,791 B1 | 8/2016 | Sutton-shearer |
| 9,442,564 B1 | 9/2016 | Dillon |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,517,403 B1 | 12/2016 | Kim et al. |
| 9,544,257 B2 | 1/2017 | Ogundokun et al. |
| 9,576,201 B2 | 2/2017 | Wu et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,789,403 B1 | 10/2017 | Furment et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |

(56) References Cited

U.S. PATENT DOCUMENTS

| | | | |
|---|---|---|---|
| 10,039,988 B2 | 8/2018 | Lobb et al. | |
| 10,055,895 B2 | 8/2018 | Li et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,173,141 B1 | 1/2019 | Schindler et al. | |
| 10,176,636 B1* | 1/2019 | Neustein | A41D 27/085 |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,318,034 B1 | 6/2019 | Hauenstein et al. | |
| 10,362,219 B2 | 7/2019 | Wilson et al. | |
| 10,387,730 B1 | 8/2019 | Cowburn et al. | |
| 10,475,225 B2 | 11/2019 | Park et al. | |
| 10,504,266 B2 | 12/2019 | Blattner et al. | |
| 10,504,287 B2 | 12/2019 | McPhee et al. | |
| 10,529,109 B1 | 1/2020 | Chen et al. | |
| 10,573,048 B2 | 2/2020 | Ni et al. | |
| 10,593,116 B2 | 3/2020 | Egri et al. | |
| 10,657,701 B2 | 5/2020 | Osman et al. | |
| 10,699,488 B1 | 6/2020 | Terrano | |
| 10,740,978 B2 | 8/2020 | McPhee et al. | |
| 10,803,665 B1 | 10/2020 | Patel | |
| 10,970,545 B1* | 4/2021 | Charles | G06V 20/20 |
| 10,990,246 B1 | 4/2021 | Law et al. | |
| 11,030,813 B2 | 6/2021 | Hare et al. | |
| 11,176,737 B2 | 11/2021 | Hare et al. | |
| 11,189,098 B2* | 11/2021 | Hare | G06T 19/006 |
| 11,195,338 B2 | 12/2021 | Mcphee et al. | |
| 11,210,850 B2 | 12/2021 | Goodrich et al. | |
| 11,227,442 B1 | 1/2022 | Goodrich et al. | |
| 11,232,646 B2 | 1/2022 | Goodrich et al. | |
| 11,263,817 B1 | 3/2022 | Goodrich et al. | |
| 11,275,252 B2 | 3/2022 | Boriskin et al. | |
| 11,308,284 B2 | 4/2022 | Huang et al. | |
| 11,443,491 B2 | 9/2022 | Hare et al. | |
| 11,501,499 B2 | 11/2022 | Goodrich et al. | |
| 11,580,700 B2 | 2/2023 | Egri et al. | |
| 11,620,791 B2 | 4/2023 | Goodrich et al. | |
| 11,636,657 B2 | 4/2023 | Goodrich et al. | |
| 11,704,878 B2 | 7/2023 | Mcphee et al. | |
| 11,715,268 B2 | 8/2023 | Hare et al. | |
| 11,823,341 B2* | 11/2023 | Hare | G06T 19/20 |
| 2002/0067362 A1 | 6/2002 | Agostino Nocera et al. | |
| 2002/0169644 A1 | 11/2002 | Greene | |
| 2004/0080467 A1 | 4/2004 | Chinthammit et al. | |
| 2004/0113915 A1 | 6/2004 | Ohtsuki et al. | |
| 2004/0179038 A1 | 9/2004 | Blattner et al. | |
| 2004/0179039 A1 | 9/2004 | Blattner et al. | |
| 2004/0212630 A1 | 10/2004 | Hobgood et al. | |
| 2005/0041842 A1 | 2/2005 | Frakes et al. | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0018811 A1 | 1/2007 | Gollu | |
| 2007/0096678 A1 | 5/2007 | Melrose | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0078758 A1 | 4/2008 | Shimura et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0160779 A1 | 6/2009 | Crockett et al. | |
| 2009/0177976 A1 | 7/2009 | Bokor et al. | |
| 2009/0202114 A1 | 8/2009 | Morin et al. | |
| 2009/0215536 A1 | 8/2009 | Yee et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0020083 A1 | 1/2010 | Kumakura et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0194782 A1 | 8/2010 | Gyorfi et al. | |
| 2010/0203968 A1 | 8/2010 | Gill et al. | |
| 2010/0227682 A1 | 9/2010 | Reville et al. | |
| 2010/0251101 A1 | 9/2010 | Haussecker et al. | |
| 2011/0064388 A1 | 3/2011 | Brown et al. | |
| 2011/0093780 A1 | 4/2011 | Dunn | |
| 2011/0115798 A1 | 5/2011 | Nayar et al. | |
| 2011/0129118 A1 | 6/2011 | Hagbi et al. | |
| 2011/0148864 A1 | 6/2011 | Lee et al. | |
| 2011/0161242 A1 | 6/2011 | Chung et al. | |
| 2011/0183732 A1 | 7/2011 | Block et al. | |
| 2011/0202598 A1 | 8/2011 | Evans et al. | |
| 2011/0205242 A1* | 8/2011 | Friesen | A43B 3/0078 345/633 |
| 2011/0239136 A1 | 9/2011 | Goldman et al. | |
| 2012/0002014 A1 | 1/2012 | Walsh | |
| 2012/0092329 A1 | 4/2012 | Koo et al. | |
| 2012/0113106 A1 | 5/2012 | Choi et al. | |
| 2012/0120186 A1 | 5/2012 | Diaz et al. | |
| 2012/0124458 A1 | 5/2012 | Cruzada | |
| 2012/0130717 A1 | 5/2012 | Xu et al. | |
| 2012/0134588 A1 | 5/2012 | Zhang et al. | |
| 2012/0146991 A1 | 6/2012 | Bala et al. | |
| 2012/0194549 A1 | 8/2012 | Osterhout et al. | |
| 2012/0206558 A1 | 8/2012 | Setton | |
| 2012/0209924 A1 | 8/2012 | Evans et al. | |
| 2012/0224773 A1 | 9/2012 | Sweet, III et al. | |
| 2012/0249416 A1 | 10/2012 | Maciocci et al. | |
| 2013/0021373 A1 | 1/2013 | Vaught et al. | |
| 2013/0023673 A1 | 1/2013 | Liang et al. | |
| 2013/0050258 A1 | 2/2013 | Liu et al. | |
| 2013/0103760 A1 | 4/2013 | Golding et al. | |
| 2013/0104084 A1 | 4/2013 | Mlyniec et al. | |
| 2013/0127980 A1 | 5/2013 | Haddick et al. | |
| 2013/0141434 A1 | 6/2013 | Sugden et al. | |
| 2013/0201187 A1 | 8/2013 | Tong et al. | |
| 2013/0223673 A1 | 8/2013 | Davis et al. | |
| 2013/0249948 A1 | 9/2013 | Reitan | |
| 2013/0257877 A1 | 10/2013 | Davis | |
| 2013/0278631 A1 | 10/2013 | Border et al. | |
| 2013/0335301 A1 | 12/2013 | Wong et al. | |
| 2013/0335405 A1 | 12/2013 | Scavezze et al. | |
| 2014/0028713 A1 | 1/2014 | Keating et al. | |
| 2014/0043329 A1 | 2/2014 | Wang et al. | |
| 2014/0047380 A1 | 2/2014 | Mak | |
| 2014/0055554 A1 | 2/2014 | Du et al. | |
| 2014/0078176 A1 | 3/2014 | Kim et al. | |
| 2014/0080560 A1 | 3/2014 | Knutsson | |
| 2014/0125678 A1 | 5/2014 | Wang et al. | |
| 2014/0129343 A1* | 5/2014 | Finster | G06Q 30/0269 705/14.66 |
| 2014/0176608 A1* | 6/2014 | Boysen | H04N 1/0044 345/633 |
| 2014/0267410 A1 | 9/2014 | Fein et al. | |
| 2014/0270703 A1 | 9/2014 | Wang et al. | |
| 2014/0292645 A1 | 10/2014 | Tsurumi | |
| 2014/0313228 A1 | 10/2014 | Kasahara | |
| 2014/0320507 A1 | 10/2014 | Myung et al. | |
| 2014/0321702 A1 | 10/2014 | Schmalstieg | |
| 2014/0344762 A1 | 11/2014 | Grasset et al. | |
| 2014/0351758 A1 | 11/2014 | Yoshida | |
| 2014/0368535 A1 | 12/2014 | Salter et al. | |
| 2015/0023602 A1 | 1/2015 | Wnuk et al. | |
| 2015/0052479 A1 | 2/2015 | Ooi et al. | |
| 2015/0098614 A1 | 4/2015 | Gee et al. | |
| 2015/0103183 A1 | 4/2015 | Abbott et al. | |
| 2015/0206349 A1 | 7/2015 | Rosenthal et al. | |
| 2015/0254467 A1 | 9/2015 | Leuthardt et al. | |
| 2015/0262029 A1 | 9/2015 | Pirchheim et al. | |
| 2015/0264304 A1 | 9/2015 | Chastney et al. | |
| 2015/0269783 A1 | 9/2015 | Yun | |
| 2015/0301599 A1 | 10/2015 | Miller | |
| 2015/0309698 A1 | 10/2015 | Senderek et al. | |
| 2015/0316985 A1 | 11/2015 | Levesque et al. | |
| 2015/0317831 A1 | 11/2015 | Ebstyne et al. | |

(56) References Cited

U.S. PATENT DOCUMENTS

| | | |
|---|---|---|
| 2015/0356788 A1 | 12/2015 | Abe et al. |
| 2015/0366527 A1 | 12/2015 | Yu et al. |
| 2015/0371447 A1 | 12/2015 | Yasutake |
| 2016/0025978 A1 | 1/2016 | Mallinson |
| 2016/0025981 A1 | 1/2016 | Burns et al. |
| 2016/0054837 A1 | 2/2016 | Stafford |
| 2016/0055676 A1 | 2/2016 | Kasahara et al. |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0196692 A1 | 7/2016 | Kjallstrom et al. |
| 2016/0234149 A1 | 8/2016 | Tsuda et al. |
| 2016/0292917 A1 | 10/2016 | Dorner et al. |
| 2016/0330522 A1 | 11/2016 | Newell et al. |
| 2016/0350967 A1 | 12/2016 | Klassen |
| 2016/0360115 A1 | 12/2016 | Rim |
| 2016/0379418 A1 | 12/2016 | Osborn et al. |
| 2017/0031503 A1 | 2/2017 | Rosenberg et al. |
| 2017/0038829 A1 | 2/2017 | Lanier et al. |
| 2017/0039986 A1 | 2/2017 | Lanier et al. |
| 2017/0052946 A1 | 2/2017 | Gu et al. |
| 2017/0061696 A1 | 3/2017 | Li et al. |
| 2017/0069134 A1 | 3/2017 | Shapira et al. |
| 2017/0069255 A1 | 3/2017 | Honkanen et al. |
| 2017/0080346 A1 | 3/2017 | Abbas |
| 2017/0087473 A1 | 3/2017 | Siegel et al. |
| 2017/0090728 A1 | 3/2017 | Kim et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0132821 A1 | 5/2017 | Valliani et al. |
| 2017/0147680 A1 | 5/2017 | Bai et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Deusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0033173 A1 | 2/2018 | Choi et al. |
| 2018/0040166 A1 | 2/2018 | Jayaraj et al. |
| 2018/0046245 A1 | 2/2018 | Schwarz et al. |
| 2018/0047200 A1 | 2/2018 | O'hara et al. |
| 2018/0061072 A1 | 3/2018 | Benezra et al. |
| 2018/0082117 A1 | 3/2018 | Sharma et al. |
| 2018/0082430 A1 | 3/2018 | Sharma et al. |
| 2018/0083978 A1 | 3/2018 | Pantazelos |
| 2018/0108179 A1 | 4/2018 | Tomlin et al. |
| 2018/0113587 A1 | 4/2018 | Allen et al. |
| 2018/0114364 A1 | 4/2018 | Mcphee et al. |
| 2018/0114365 A1 | 4/2018 | Egri et al. |
| 2018/0115503 A1 | 4/2018 | Baldwin et al. |
| 2018/0122043 A1 | 5/2018 | Energin et al. |
| 2018/0122142 A1 | 5/2018 | Egeler et al. |
| 2018/0143748 A1 | 5/2018 | Ahmed et al. |
| 2018/0143950 A1 | 5/2018 | Al-arnaouti et al. |
| 2018/0152400 A1 | 5/2018 | Chung et al. |
| 2018/0158250 A1 | 6/2018 | Yamamoto et al. |
| 2018/0160194 A1 | 6/2018 | Bayliss et al. |
| 2018/0174366 A1 | 6/2018 | Nishibe et al. |
| 2018/0174600 A1 | 6/2018 | Chaudhuri et al. |
| 2018/0189743 A1 | 7/2018 | Balasubramanian et al. |
| 2018/0190022 A1 | 7/2018 | Zamir et al. |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1 | 11/2018 | Liu et al. |
| 2018/0335930 A1 | 11/2018 | Scapel et al. |
| 2018/0336714 A1 | 11/2018 | Stoyles et al. |
| 2018/0345129 A1 | 12/2018 | Rathod |
| 2018/0349451 A1 | 12/2018 | O'connell et al. |
| 2018/0349703 A1 | 12/2018 | Rathod |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0073834 A1 | 3/2019 | Holzer et al. |
| 2019/0102922 A1 | 4/2019 | Gum |
| 2019/0107991 A1 | 4/2019 | Spivack et al. |
| 2019/0108578 A1* | 4/2019 | Spivack ................ G09B 5/065 |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0342507 A1* | 11/2019 | Dye ........................ G06T 13/40 |
| 2019/0347865 A1 | 11/2019 | Hackett et al. |
| 2019/0385378 A1 | 12/2019 | Bastian et al. |
| 2020/0066014 A1 | 2/2020 | Mehta et al. |
| 2020/0066052 A1* | 2/2020 | Antonsen ............... G06T 19/006 |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0201514 A1 | 6/2020 | Murphy et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0042993 A1 | 2/2021 | Tagra et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0183158 A1 | 6/2021 | Korngold et al. |
| 2021/0241537 A1 | 8/2021 | Ahn |
| 2021/0256773 A1 | 8/2021 | Hare et al. |
| 2021/0264668 A1 | 8/2021 | Goodrich et al. |
| 2022/0036660 A1 | 2/2022 | Mcphee et al. |
| 2022/0044311 A1 | 2/2022 | Ray |
| 2022/0044479 A1 | 2/2022 | Hare et al. |
| 2022/0070385 A1 | 3/2022 | Van Os et al. |
| 2022/0076497 A1 | 3/2022 | Goodrich et al. |
| 2022/0076504 A1 | 3/2022 | Goodrich et al. |
| 2022/0121874 A1 | 4/2022 | Mayes et al. |
| 2022/0148248 A1 | 5/2022 | Mcintyre-kirwin et al. |
| 2022/0148270 A1 | 5/2022 | Goodrich et al. |
| 2022/0375178 A1 | 11/2022 | Hare et al. |
| 2023/0037233 A1 | 2/2023 | Goodrich et al. |
| 2023/0089838 A1 | 3/2023 | Goodrich et al. |
| 2023/0142438 A1 | 5/2023 | Egri et al. |
| 2023/0215117 A1 | 7/2023 | Goodrich et al. |
| 2023/0245401 A1 | 8/2023 | Mcphee et al. |
| 2023/0316683 A1 | 10/2023 | Hare et al. |

FOREIGN PATENT DOCUMENTS

| | | |
|---|---|---|
| CN | 102884490 A | 1/2013 |
| CN | 103443582 A | 12/2013 |
| CN | 103460256 A | 12/2013 |
| CN | 103530495 A | 1/2014 |
| CN | 104081317 A | 10/2014 |
| CN | 104764452 A | 7/2015 |
| CN | 105210116 A | 12/2015 |
| CN | 105278826 A | 1/2016 |
| CN | 105607034 A | 5/2016 |
| CN | 106033333 A | 10/2016 |
| CN | 107093204 A | 8/2017 |

(56) References Cited

FOREIGN PATENT DOCUMENTS

| | | |
|---|---|---|
| CN | 107209950 A | 9/2017 |
| CN | 107329962 A | 11/2017 |
| CN | 107341853 | 11/2017 |
| CN | 107590453 A | 1/2018 |
| CN | 107735816 | 2/2018 |
| CN | 109035420 | 12/2018 |
| CN | 109863510 A | 6/2019 |
| CN | 109863532 A | 6/2019 |
| CN | 110168476 A | 8/2019 |
| CN | 110168478 A | 8/2019 |
| CN | 110199245 A | 9/2019 |
| CN | 112639691 A | 4/2021 |
| CN | 113330484 A | 8/2021 |
| CN | 114026831 A | 2/2022 |
| CN | 114080628 A | 2/2022 |
| CN | 108027653 B | 3/2022 |
| CN | 114341780 A | 4/2022 |
| CN | 110168476 B | 11/2022 |
| CN | 110168478 B | 1/2023 |
| CN | 115641424 A | 1/2023 |
| CN | 115933886 A | 4/2023 |
| CN | 114026831 | 3/2024 |
| CN | 118158181 | 6/2024 |
| EP | 2157545 A1 | 2/2010 |
| EP | 2184092 A2 | 5/2010 |
| EP | 3086292 A1 | 10/2016 |
| EP | 3506213 A1 | 7/2019 |
| GB | 201404134 | 4/2014 |
| JP | 2001230801 A | 8/2001 |
| JP | 2005258821 A | 9/2005 |
| JP | 2013164697 A | 8/2013 |
| JP | 5497931 B2 | 3/2014 |
| KR | 20120061197 A | 6/2012 |
| KR | 20130119473 A | 10/2013 |
| KR | 20140020871 A | 2/2014 |
| KR | 101445263 B1 | 9/2014 |
| KR | 20150013709 A | 2/2015 |
| KR | 20150038272 A | 4/2015 |
| KR | 20150126938 A | 11/2015 |
| KR | 20160019964 A | 2/2016 |
| KR | 20180006951 | 1/2018 |
| KR | 20190075977 A | 7/2019 |
| KR | 102254709 B1 | 5/2021 |
| KR | 102257167 B1 | 5/2021 |
| KR | 102317167 B1 | 10/2021 |
| KR | 102367928 B1 | 3/2022 |
| KR | 102406297 B1 | 6/2022 |
| KR | 102406437 B1 | 6/2022 |
| KR | 102482293 B1 | 12/2022 |
| KR | 102491191 B1 | 1/2023 |
| KR | 102606601 B1 | 11/2023 |
| KR | 102653793 | 3/2024 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-2013017991 A1 | 2/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018081125 A1 | 5/2018 |
| WO | WO-2018102562 A1 | 6/2018 |
| WO | WO-2018122167 A1 | 7/2018 |
| WO | WO-2018128930 | 7/2018 |
| WO | WO-2018129531 | 7/2018 |
| WO | WO-2018129531 A1 | 7/2018 |
| WO | WO-2018136222 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

US 11,551,423 B2, 01/2023, Egri et al. (withdrawn)
Besancon, et al., "A Tangible Volume for Portable 3D Interaction", Internet Posting, [Online] Retrieved from the internet: <https://www.youtube.com/watch?v=LP7GG6t2j-g>, (Sep. 27, 2016), 23 pgs; 3:21 min.
"U.S. Appl. No. 15/792,347, Final Office Action mailed Jul. 9, 2019", 13 pgs.
"U.S. Appl. No. 15/792,347, Non Final Office Action mailed Mar. 21, 2019", 12 pgs.
"U.S. Appl. No. 15/792,347, Notice of Allowance mailed Aug. 5, 2019", 9 pgs.
"U.S. Appl. No. 15/792,347, Response filed Apr. 22, 2019 to Non Final Office Action mailed Mar. 21, 2019", 9 pgs.
"U.S. Appl. No. 15/792,347, Response filed Jul. 16, 2019 to Final Office Action mailed Jul. 9, 2019", 9 pgs.
"U.S. Appl. No. 15/804,550, Advisory Action mailed Jul. 23, 2021", 3 pgs.
"U.S. Appl. No. 15/804,550, Examiner Interview Summary mailed Feb. 7, 2022", 3 pgs.
"U.S. Appl. No. 15/804,550, Examiner Interview Summary mailed Jun. 8, 2022", 3 pgs.
"U.S. Appl. No. 15/804,550, Final Office Action mailed Jan. 31, 2023", 29 pgs.
"U.S. Appl. No. 15/804,550, Final Office Action mailed Apr. 4, 2022", 31 pgs.
"U.S. Appl. No. 15/804,550, Final Office Action mailed May 13, 2021", 25 pgs.
"U.S. Appl. No. 15/804,550, Final Office Action mailed Jul. 23, 2020", 24 pgs.
"U.S. Appl. No. 15/804,550, Final Office Action mailed Sep. 19, 2019", 23 pgs.
"U.S. Appl. No. 15/804,550, Non Final Office Action mailed Feb. 6, 2020", 24 pgs.
"U.S. Appl. No. 15/804,550, Non Final Office Action mailed Apr. 18, 2019", 18 pgs.
"U.S. Appl. No. 15/804,550, Non Final Office Action mailed Aug. 9, 2022", 28 pgs.
"U.S. Appl. No. 15/804,550, Non Final Office Action mailed Oct. 29, 2021", 31 pgs.
"U.S. Appl. No. 15/804,550, Non Final Office Action mailed Dec. 23, 2020", 24 pgs.
"U.S. Appl. No. 15/804,550, Response filed Jan. 21, 2020 to Final Office Action mailed Sep. 19, 2019", 10 pgs.
"U.S. Appl. No. 15/804,550, Response filed Jan. 31, 2022 to Non Final Office Action mailed Oct. 29, 2021", 10 pgs.
"U.S. Appl. No. 15/804,550, Response filed Mar. 23, 2021 to Non Final Office Action mailed Dec. 23, 2020", 9 pgs.
"U.S. Appl. No. 15/804,550, Response filed Jun. 8, 2020 to Non Final Office Action mailed Feb. 6, 2020", 10 pgs.
"U.S. Appl. No. 15/804,550, Response filed Jul. 5, 2022 to Final Office Action mailed Apr. 4, 2022", 11 pgs.
"U.S. Appl. No. 15/804,550, Response filed Jul. 13, 2021 to Final Office Action mailed May 13, 2021", 10 pgs.
"U.S. Appl. No. 15/804,550, Response filed Oct. 23, 2020 to Final Office Action mailed Jul. 23, 2020", 10 pgs.
"U.S. Appl. No. 15/804,550, Response filed Nov. 8, 2022 to Non Final Office Action mailed Aug. 9, 2022", 10 pgs.
"U.S. Appl. No. 15/804,550, Response filed Aug. 9, 2019 to Non-Final Office Action mailed Apr. 18, 2019", 12 pgs.
"U.S. Appl. No. 16/579,463, Non Final Office Action mailed Oct. 21, 2019", 8 pgs.
"U.S. Appl. No. 16/579,463, Response filed Nov. 11, 2019 to Non Final Office Action mailed Oct. 21, 2019", 10 pgs.
"U.S. Appl. No. 16/790,322, 312 Amendment filed Oct. 12, 2022", 8 pgs.

(56) References Cited

OTHER PUBLICATIONS

"U.S. Appl. No. 16/790,322, Corrected Notice of Allowability mailed Jan. 19, 2023", 2 pgs.
"U.S. Appl. No. 16/790,322, Corrected Notice of Allowability mailed Oct. 27, 2022", 2 pgs.
"U.S. Appl. No. 16/790,322, Corrected Notice of Allowability mailed Dec. 13, 2022", 2 pgs.
"U.S. Appl. No. 16/790,322, Notice of Allowance mailed Aug. 31, 2022", 8 pgs.
"U.S. Appl. No. 17/506,478, Final Office Action mailed Dec. 16, 2022", 36 pgs.
"U.S. Appl. No. 17/506,478, Non Final Office Action mailed Sep. 2, 2022", 34 pgs.
"U.S. Appl. No. 17/506,478, Notice of Allowance mailed Feb. 24, 2023", 13 pgs.
"U.S. Appl. No. 17/506,478, Notice of Allowance mailed Aug. 2, 2023", 9 pgs.
"U.S. Appl. No. 17/506,478, Response filed Feb. 13, 2023 to Final Office Action mailed Dec. 16, 2022", 10 pgs.
"U.S. Appl. No. 17/506,478, Response filed Nov. 17, 2022 to Non Final Office Action mailed Sep. 2, 2022", 9 pgs.
"U.S. Appl. No. 17/527,376, Final Office Action mailed Oct. 30, 2023", 20 pgs.
"U.S. Appl. No. 17/527,376, Non Final Office Action mailed Jul. 5, 2023", 20 pgs.
"U.S. Appl. No. 17/527,376, Response filed Oct. 5, 2023 to Non Final Office Action mailed Jul. 5, 2023", 12 pgs.
"U.S. Appl. No. 17/528,697, Non Final Office Action mailed Sep. 15, 2022", 12 pgs.
"U.S. Appl. No. 17/528,697, Notice of Allowance mailed Jan. 11, 2023", 10 pgs.
"U.S. Appl. No. 17/528,697, Response filed Dec. 2, 2022 to Non Final Office Action mailed Sep. 15, 2022", 8 pgs.
"U.S. Appl. No. 17/581,093, Notice of Allowance mailed Jul. 6, 2023", 9 pgs.
"U.S. Appl. No. 18/121,893, Non Final Office Action mailed Jul. 20, 2023", 15 pgs.
"U.S. Appl. No. 18/121,893, Response filed Sep. 13, 2023 to Non Final Office Action mailed Jul. 20, 2023", 8 pgs.
"U.S. Appl. No. 18/132,940, Non Final Office Action mailed Nov. 22, 2023", 37 pgs.
"Chinese Application Serial No. 201780065649.3, Office Action mailed Dec. 2, 2022", W/English Translation, 11 pgs.
"Chinese Application Serial No. 201780082612.1, Office Action mailed Jan. 29, 2022", w/ English translation, 16 pgs.
"Chinese Application Serial No. 201780084184.6, Office Action mailed Feb. 7, 2022", w/ English translation, 22 pgs.
"Chinese Application Serial No. 201780084184.6, Office Action mailed Jul. 29, 2022", W/English Translation, 18 pgs.
"Chinese Application Serial No. 201780084184.6, Response filed Oct. 13, 2022 to Office Action mailed Jul. 29, 2022", w/ English Claims, 12 pgs.
"Chinese Application Serial No. 201980056286.6, Office Action mailed Oct. 12, 2023", w/ English Translation, 12 pgs.
"Chinese Application Serial No. 202080047024.6, Office Action mailed Jun. 29, 2023", w/ English translation, 18 pgs.
"Chinese Application Serial No. 202080047024.6, Office Action mailed Oct. 7, 2023", W/English Translation, 8 pgs.
"European Application Serial No. 17835985.7 Response to Communication Pursuant to Rules 161(1) and 162 EPC filed Feb. 21, 2020", 10 pgs.
"European Application Serial No. 17835983.2, Response Filed Mar. 2, 2022 to Communication Pursuant to Article 94(3) EPC mailed Aug. 24, 2021", 12 pgs.
"European Application Serial No. 17835985.7, Communication Pursuant to Article 94(3) EPC mailed Nov. 15, 2021", 10 pgs.
"European Application Serial No. 17865596.5, Response filed Jan. 31, 2022 to Communication Pursuant to Article 94(3) EPC mailed Sep. 23, 2021", w/English claims, 16 pgs.
"European Application Serial No. 17865596.5, Summons to Attend Oral Proceedings mailed Jan. 4, 2023", 11 pgs.
"European Application Serial No. 20751041.3, Response Filed Aug. 10, 2022 to Communication pursuant to Rules 161(1) and 162 EPC mailed Feb. 9, 2022", 27 pgs.
"European Application Serial No. 23153345.6, Response filed Nov. 14, 2023 to Extended European Search Report mailed May 8, 2023", 15 pgs.
"International Application Serial No. PCT/US2017/069061, International Preliminary Report on Patentability mailed Aug. 1, 2019", 8 pgs.
"International Application Serial No. PCT/US2017/069061, International Search Report mailed Apr. 10, 2018", 5 pgs.
"International Application Serial No. PCT/US2017/069061, Written Opinion mailed Apr. 10, 2018", 6 pgs.
"Korean Application Serial No. 10-2019-7024288, Final Office Action mailed Jan. 8, 2022", w/ English translation, 5 pgs.
"Korean Application Serial No. 10-2019-7024288, Notice of Preliminary Rejection mailed Jun. 1, 2021", w/ English translation, 14 pgs.
"Korean Application Serial No. 10-2019-7024288, Notice of Preliminary Rejection mailed Dec. 15, 2020", w/ English translation, 11 pgs.
"Korean Application Serial No. 10-2019-7024288, Response filed Feb. 15, 2021 to Notice of Preliminary Rejection mailed Dec. 15, 2020", w/ English claims, 22 pgs.
"Korean Application Serial No. 10-2019-7024288, Response filed Aug. 18, 2021 to Notice of Preliminary Rejection mailed Jun. 1, 2021", w/ English claims, 22 pgs.
"Korean Application Serial No. 10-2021-7008906, Notice of Preliminary Rejection mailed Jun. 20, 2023", w/ English translation, 9 pgs.
"Korean Application Serial No. 10-2021-7014739, Final Office Action mailed Dec. 27, 2021", w/ English translation, 6 pgs.
"Korean Application Serial No. 10-2021-7033821, Final Office Action mailed Jun. 21, 2022", W/English Translation, 6 pgs.
"Korean Application Serial No. 10-2021-7033821, Notice of Preliminary Rejection mailed Nov. 16, 2021", w/ English Translation, 7 pgs.
"Korean Application Serial No. 10-2021-7033821, Response Filed Feb. 16, 2022 to Notice of Preliminary Rejection mailed Nov. 16, 2021", w/English Claims, 22 pgs.
"Korean Application Serial No. 10-2021-7033821, Response filed Sep. 20, 2022 to Final Office Action mailed Jun. 21, 2022", w/ English Claims, 16 pgs.
"Korean Application Serial No. 10-2022-7018662, Notice of Preliminary Rejection mailed Jun. 29, 2022", W/English Translation, 9 pgs.
"Korean Application Serial No. 10-2022-7018662, Office Action mailed Dec. 27, 2022", w/ English Translation, 5 pgs.
"Korean Application Serial No. 10-2022-7018662, Response filed Aug. 29, 2022 to Notice of Preliminary Rejection mailed Jun. 29, 2022", With English machine translation, 15 pgs.
"Korean Application Serial No. 10-2022-7018734, Notice of Preliminary Rejection mailed Jun. 15, 2022", w/ English translation, 12 pgs.
"Korean Application Serial No. 10-2022-7018734, Response filed Jul. 22, 2022 to Notice of Preliminary Rejection mailed Jun. 15, 2022", w/ English Claims, 18 pgs.
"Korean Application Serial No. 10-2023-7002059, Notice of Preliminary Rejection mailed Feb. 15, 2023", w/ English Translation, 9 pgs.
Merriliance, et al., "Analysis of Object Picking Algorithms Using Bounding Box in Non Immersive Virtual World", International Journal of Engineering and Innovative Technology, vol. 1, Issue 2, (Feb. 2012), 8 pgs.
Wroblewski, Luke, et al., "Touch Gesture Reference Guide", [Online] Retrieved from the internet: <URL: http://web.archive.org/web/20100423034847/http://www.lukew.com/ff/entry.asp?1071>, (Apr. 15, 2010), 14 pgs.
"U.S. Appl. No. 18/073,280, Non Final Office Action mailed Dec. 22, 2023", 23 pgs.

(56) References Cited

OTHER PUBLICATIONS

"Chinese Application Serial No. 202080047024.6, Response Filed Dec. 22, 2023 to Office Action mailed Oct. 7, 2023", w English Claims, 50 pgs.

"U.S. Appl. No. 18/132,940, Response filed Feb. 20, 2024 to Non Final Office Action mailed Nov. 22, 2023", 11 pgs.

"U.S. Appl. No. 17/527,376, Examiner Interview Summary mailed Feb. 26, 2024", 2 pgs.

"U.S. Appl. No. 17/527,376, Response filed Feb. 28, 2024 to Final Office Action mailed Oct. 30, 2023", 9 pgs.

"Chinese Application Serial No. 201980056286.6, Response filed Feb. 27, 2024 to Office Action mailed Oct. 12, 2023", W English Claims, 15 pgs.

"U.S. Appl. No. 18/132,940, Final Office Action mailed Mar. 6, 2024", 13 pgs.

"Chinese Application Serial No. 201980084220.8, Office Action mailed Jan. 10, 2024", w English Translation, 16 pgs.

"U.S. Appl. No. 18/073,280, Examiner Interview Summary mailed Mar. 11, 2024", 2 pgs.

"U.S. Appl. No. 18/073,280 , Response filed Mar. 20, 2024 to Non Final Office Action mailed Dec. 22, 2023", 10 pgs.

"European Application Serial No. 20775562.0, Communication Pursuant to Article 94(3) EPC mailed Feb. 6, 2024", 7 pgs.

"U.S. Appl. No. 17/527,376, Non Final Office Action mailed Apr. 26, 2024", 22 pgs.

"Korean Application Serial No. 10-2021-7022388, Notice of Preliminary Rejection mailed Apr. 15, 2024", w English translation, 14 pgs.

"U.S. Appl. No. 18/132,940, Response filed May 6, 2024 to Final Office Action mailed Mar. 6, 2024", 10 pgs.

"Chinese Application Serial No. 201980084220.8, Response filed May 21, 2024 to Office Action mailed Jan. 10, 2024", w current English claims, 13 pgs.

"U.S. Appl. No. 18/073,280, Notice of Allowance mailed May 24, 2024", 8 pgs.

"U.S. Appl. No. 18/132,940, Notice of Allowance mailed Jun. 5, 2024", 9 pgs.

"U.S. Appl. No. 18/073,280, Corrected Notice of Allowability mailed Jun. 6, 2024", 2 pgs.

"U.S. Appl. No. 15/581,994, Corrected Notice of Allowability mailed Jan. 7, 2020", 2 pgs.

"U.S. Appl. No. 15/581,994, Corrected Notice of Allowability mailed Feb. 18, 2020", 3 pgs.

"U.S. Appl. No. 15/581,994, Final Office Action mailed Dec. 3, 2018", 18 pgs.

"U.S. Appl. No. 15/581,994, Non Final Office Action mailed Jun. 6, 2019", 15 pgs.

"U.S. Appl. No. 15/581,994, Non Final Office Action mailed Jun. 26, 2018", 14 pgs.

"U.S. Appl. No. 15/581,994, Notice of Allowance mailed Nov. 6, 2019", 8 pgs.

"U.S. Appl. No. 15/581,994, Response filed Feb. 26, 2019 to Final Office Action mailed Dec. 3, 2018", 11 pgs.

"U.S. Appl. No. 15/581,994, Response filed Sep. 26, 2018 to Non Final Office Action mailed Jun. 26, 2018", 11 pgs.

"U.S. Appl. No. 15/581,994, Response filed Aug. 19, 2019 to Non-Final Office Action mailed Jun. 6, 2019", 12 pgs.

"U.S. Appl. No. 15/863,575, Non Final Office Action mailed Aug. 9, 2018", 14 pgs.

"U.S. Appl. No. 15/863,575, Notice of Allowance mailed Nov. 15, 2018", 8 pgs.

"U.S. Appl. No. 15/863,575, Response filed Sep. 24, 2018 to Non Final Office Action mailed Aug. 9, 2018", 9 pgs.

"U.S. Appl. No. 16/242,708, Corrected Notice of Allowability mailed Feb. 23, 2021", 2 pgs.

"U.S. Appl. No. 16/242,708, Examiner Interview Summary mailed Jul. 29, 2020", 3 pgs.

"U.S. Appl. No. 16/242,708, Final Office Action mailed Jul. 2, 2020", 25 pgs.

"U.S. Appl. No. 16/242,708, Non Final Office Action mailed Feb. 28, 2020", 19 pgs.

"U.S. Appl. No. 16/242,708, Notice of Allowance mailed Feb. 4, 2021", 7 pgs.

"U.S. Appl. No. 16/242,708, Notice of Allowance mailed Aug. 19, 2020", 5 pgs.

"U.S. Appl. No. 16/242,708, Notice of Allowance mailed Nov. 4, 2020", 7 pgs.

"U.S. Appl. No. 16/242,708, Response filed May 15, 2020 to Non Final Office Action mailed Feb. 28, 2020", 11 pgs.

"U.S. Appl. No. 16/242,708, Response filed Aug. 5, 2020 to Final Office Action mailed Jul. 2, 2020", 11 pgs.

"U.S. Appl. No. 16/283,482, Examiner Interview Summary mailed Feb. 19, 2020", 3 pgs.

"U.S. Appl. No. 16/283,482, Final Office Action mailed Dec. 16, 2019", 15 pgs.

"U.S. Appl. No. 16/283,482, Non Final Office Action mailed Jun. 26, 2019", 13 pgs.

"U.S. Appl. No. 16/283,482, Notice of Allowance mailed Apr. 2, 2020", 9 pgs.

"U.S. Appl. No. 16/283,482, Response filed Mar. 9, 2020 to Final Office Action mailed Dec. 16, 2019", 11 pgs.

"U.S. Appl. No. 16/283,482, Response filed Sep. 26, 2019 to Non Final Office Action mailed Jun. 26, 2019", 13 pgs.

"U.S. Appl. No. 16/457,461, Corrected Notice of Allowability mailed Feb. 26, 2021", 2 pgs.

"U.S. Appl. No. 16/457,461, Examiner Interview Summary mailed Jul. 10, 2020", 3 pgs.

"U.S. Appl. No. 16/457,461, Final Office Action mailed Jul. 14, 2020", 16 pgs.

"U.S. Appl. No. 16/457,461, Non Final Office Action mailed Apr. 16, 2020", 13 pgs.

"U.S. Appl. No. 16/457,461, Notice of Allowance mailed Apr. 14, 2021", 7 pgs.

"U.S. Appl. No. 16/457,461, Notice of Allowance mailed Jul. 28, 2021", 5 pgs.

"U.S. Appl. No. 16/457,461, Notice of Allowance mailed Sep. 2, 2020", 7 pgs.

"U.S. Appl. No. 16/457,461, Notice of Allowance mailed Nov. 19, 2020", 8 pgs.

"U.S. Appl. No. 16/457,461, Response filed Jul. 1, 2020 to Non Final Office Action mailed Apr. 16, 2020", 9 pgs.

"U.S. Appl. No. 16/457,461, Response filed Aug. 20, 2020 to Final Office Action mailed Jul. 14, 2020", 8 pgs.

"U.S. Appl. No. 16/460,519, Advisory Action mailed Mar. 9, 2021", 4 pgs.

"U.S. Appl. No. 16/460,519, Final Office Action mailed Jan. 6, 2021", 33 pgs.

"U.S. Appl. No. 16/460,519, Non Final Office Action mailed Mar. 17, 2021", 37 pgs.

"U.S. Appl. No. 16/460,519, Non Final Office Action mailed Sep. 4, 2020", 27 pgs.

"U.S. Appl. No. 16/460,519, Notice of Allowance mailed Jul. 12, 2021", 5 pgs.

"U.S. Appl. No. 16/460,519, Response filed Feb. 23, 2021 to Final Office Action mailed Jan. 6, 2021", 10 pgs.

"U.S. Appl. No. 16/460,519, Response filed Jun. 15, 2021 to Non Final Office Action mailed Mar. 17, 2021", 10 pgs.

"U.S. Appl. No. 16/460,519, Response filed Dec. 2, 2020 to Non Final Office Action mailed Sep. 4, 2020", 10 pgs.

"U.S. Appl. No. 16/696,600, 312 Amendment filed Jul. 7, 2021", 7 pgs.

"U.S. Appl. No. 16/696,600, Corrected Notice of Allowability mailed May 12, 2021", 2 pgs.

"U.S. Appl. No. 16/696,600, Corrected Notice of Allowability mailed Jul. 21, 2021", 3 pgs.

"U.S. Appl. No. 16/696,600, Corrected Notice of Allowability mailed Sep. 8, 2021", 2 pgs.

"U.S. Appl. No. 16/696,600, Non Final Office Action mailed Sep. 15, 2020", 20 pgs.

"U.S. Appl. No. 16/696,600, Notice of Allowability mailed Jan. 26, 2021", 2 pgs.

(56) References Cited

OTHER PUBLICATIONS

"U.S. Appl. No. 16/696,600, Notice of Allowance mailed May 4, 2021", 9 pgs.
"U.S. Appl. No. 16/696,600, Notice of Allowance mailed Aug. 17, 2021", 8 pgs.
"U.S. Appl. No. 16/696,600, Notice of Allowance mailed Dec. 18, 2020", 11 pgs.
"U.S. Appl. No. 16/696,600, Response filed Oct. 30, 2020 to Non Final Office Action mailed Sep. 15, 2020", 8 pgs.
"U.S. Appl. No. 16/721,418, Final Office Action mailed Aug. 4, 2021", 31 pgs.
"U.S. Appl. No. 16/721,418, Non Final Office Action mailed Apr. 29, 2021", 28 pgs.
"U.S. Appl. No. 16/721,418, Notice of Allowance mailed Oct. 21, 2021", 8 pgs.
"U.S. Appl. No. 16/721,418, Response filed Jul. 28, 2021 to Non Final Office Action mailed Apr. 29, 2021", 11 pgs.
"U.S. Appl. No. 16/721,418, Response filed Oct. 4, 2021 to Final Office Action mailed Aug. 4, 2021", 12 pgs.
"U.S. Appl. No. 16/721,459, Non Final Office Action mailed Apr. 15, 2021", 17 pgs.
"U.S. Appl. No. 16/721,459, Notice of Allowability mailed Dec. 17, 2021", 6 pgs.
"U.S. Appl. No. 16/721,459, Notice of Allowance mailed Aug. 19, 2021", 10 pgs.
"U.S. Appl. No. 16/721,459, Response filed Jul. 6, 2021 to Non Final Office Action mailed Apr. 15, 2021", 10 pgs.
"U.S. Appl. No. 16/723,540, Amendment Under 37 C.F.R. 1.312 Filed Sep. 20, 2022", 8 pgs.
"U.S. Appl. No. 16/723,540, Examiner Interview Summary mailed Jun. 16, 2021", 2 pgs.
"U.S. Appl. No. 16/723,540, Final Office Action mailed Sep. 27, 2021", 18 pgs.
"U.S. Appl. No. 16/723,540, Non Final Office Action mailed Jan. 26, 2022", 19 pgs.
"U.S. Appl. No. 16/723,540, Non Final Office Action mailed Mar. 18, 2021", 15 pgs.
"U.S. Appl. No. 16/723,540, Notice of Allowance mailed Jun. 29, 2022", 5 pgs.
"U.S. Appl. No. 16/723,540, PTO Response to Rule 312 Communication mailed Sep. 29, 2022", 2 pgs.
"U.S. Appl. No. 16/723,540, Response filed Apr. 26, 2022 to Non Final Office Action mailed Jan. 26, 2022", 10 pgs.
"U.S. Appl. No. 16/723,540, Response filed Jun. 16, 2021 to Non Final Office Action mailed Mar. 18, 2021", 10 pgs.
"U.S. Appl. No. 16/723,540, Response filed Dec. 23, 2021 to Final Office Action mailed Sep. 27, 2021", 10 pgs.
"U.S. Appl. No. 16/723,540, Supplemental Notice of Allowability mailed Aug. 15, 2022", 8 pgs.
"U.S. Appl. No. 16/723,540, Supplemental Notice of Allowability mailed Sep. 29, 2022", 2 pgs.
"U.S. Appl. No. 16/747,318, 312 Amendment filed Nov. 5, 2021", 7 pgs.
"U.S. Appl. No. 16/747,318, Corrected Notice of Allowability mailed Dec. 22, 2021", 2 pgs.
"U.S. Appl. No. 16/747,318, Examiner Interview Summary mailed Mar. 12, 2021", 2 pgs.
"U.S. Appl. No. 16/747,318, Final Office Action mailed May 12, 2021", 14 pgs.
"U.S. Appl. No. 16/747,318, Non Final Office Action mailed Dec. 15, 2020", 11 pgs.
"U.S. Appl. No. 16/747,318, Notice of Allowance mailed Sep. 9, 2021", 6 pgs.
"U.S. Appl. No. 16/747,318, PTO Response to Rule 312 Communication mailed Nov. 23, 2021", 3 pgs.
"U.S. Appl. No. 16/747,318, Response filed Mar. 15, 2021 to Non Final Office Action mailed Dec. 15, 2020", 11 pgs.
"U.S. Appl. No. 16/747,318, Response filed Aug. 12, 2021 to Final Office Action mailed May 12, 2021", 11 pgs.
"U.S. Appl. No. 16/790,322, Corrected Notice of Allowability mailed Feb. 15, 2022", 2 pgs.
"U.S. Appl. No. 16/790,322, Examiner Interview Summary mailed Jun. 14, 2021", 2 pgs.
"U.S. Appl. No. 16/790,322, Final Office Action mailed May 3, 2021", 22 pgs.
"U.S. Appl. No. 16/790,322, Non Final Office Action mailed Nov. 25, 2020", 21 pgs.
"U.S. Appl. No. 16/790,322, Notice of Allowance mailed Jul. 27, 2022", 8 pgs.
"U.S. Appl. No. 16/790,322, Notice of Allowance mailed Nov. 29, 2021", 8 pgs.
"U.S. Appl. No. 16/790,322, Response filed Feb. 25, 2021 to Non Final Office Action mailed Nov. 25, 2020", 9 pgs.
"U.S. Appl. No. 16/790,322, Response filed Aug. 2, 2021 to Final Office Action mailed May 3, 2021", 10 pgs.
"U.S. Appl. No. 16/922,618, Non Final Office Action mailed Apr. 27, 2021", 9 pgs.
"U.S. Appl. No. 16/922,618, Notice of Allowance mailed Aug. 4, 2021", 9 pgs.
"U.S. Appl. No. 16/922,618, Response filed Jun. 17, 2021 to Non Final Office Action mailed Apr. 27, 2021", 7 pgs.
"U.S. Appl. No. 17/249,092, Notice of Allowability mailed Aug. 12, 2022", 2 pgs.
"U.S. Appl. No. 17/249,092, Notice of Allowance mailed May 4, 2022", 12 pgs.
"U.S. Appl. No. 17/307,354, Advisory Action mailed Feb. 21, 2023", 3 pgs.
"U.S. Appl. No. 17/307,354, Corrected Notice of Allowability mailed Mar. 24, 2023", 2 pgs.
"U.S. Appl. No. 17/307,354, Final Office Action mailed Dec. 29, 2022", 30 pgs.
"U.S. Appl. No. 17/307,354, Non Final Office Action mailed Jun. 24, 2022", 29 pgs.
"U.S. Appl. No. 17/307,354, Notice of Allowance mailed Mar. 10, 2023", 7 pgs.
"U.S. Appl. No. 17/307,354, Response filed Feb. 9, 2023 to Final Office Action mailed Dec. 29, 2022", 13 pgs.
"U.S. Appl. No. 17/307,354, Response filed Sep. 20, 2022 to Non Final Office Action mailed Jun. 24, 2022", 13 pgs.
"U.S. Appl. No. 17/319,399, Corrected Notice of Allowability mailed Jan. 11, 2023", 2 pgs.
"U.S. Appl. No. 17/319,399, Corrected Notice of Allowability mailed Feb. 27, 2023", 2 pgs.
"U.S. Appl. No. 17/319,399, Non Final Office Action mailed Apr. 22, 2022", 8 pgs.
"U.S. Appl. No. 17/319,399, Notice of Allowance mailed Aug. 25, 2022", 9 pgs.
"U.S. Appl. No. 17/319,399, Response filed Jul. 21, 2022 to Non Final Office Action mailed Apr. 22, 2022", 8 pgs.
"U.S. Appl. No. 17/505,370, Non Final Office Action mailed Oct. 17, 2022", 16 pgs.
"U.S. Appl. No. 17/505,370, Notice of Allowability mailed Jun. 1, 2023", 2 pgs.
"U.S. Appl. No. 17/505,370, Notice of Allowance mailed Jan. 13, 2023", 8 pgs.
"U.S. Appl. No. 17/505,370, Response filed Dec. 21, 2022 to Non Final Office Action mailed Oct. 17, 2022", 8 pgs.
"U.S. Appl. No. 17/527,376, Examiner Interview Summary mailed Jun. 1, 2023", 2 pgs.
"U.S. Appl. No. 17/527,376, Final Office Action mailed Mar. 1, 2023", 21 pgs.
"U.S. Appl. No. 17/527,376, Non Final Office Action mailed Nov. 10, 2022", 20 pgs.
"U.S. Appl. No. 17/527,376, Response filed Feb. 10, 2023 to Non Final Office Action mailed Nov. 10, 2022", 12 pgs.
"U.S. Appl. No. 17/527,376, Response filed May 30, 2023 to Final Office Action mailed Mar. 1, 2023", 12 pgs.
"U.S. Appl. No. 17/817,491, Non Final Office Action mailed May 10, 2023", 15 pgs.
"U.S. Appl. No. 17/817,491, Notice of Allowance mailed Jul. 20, 2023", 7 pgs.

(56) References Cited

OTHER PUBLICATIONS

"U.S. Appl. No. 17/817,491, Response filed Jun. 30, 2023 to Non Final Office Action mailed May 10, 2023", 9 pgs.
"Chinese Application Serial No. 201880006129.X, Response to Examiner Telephone Interview filed Sep. 22, 2022", With English machine translation, 102 pgs.
"Chinese Application Serial No. 201880006129, Response filed Aug. 29, 2022 to Office Action mailed Jun. 17, 2022", w/ English Claims, 14 pgs.
"Chinese Application Serial No. 201880006129.X, Office Action mailed Jan. 5, 2022", w/ English translation, 18 pgs.
"Chinese Application Serial No. 201880006129.X, Office Action mailed Jun. 17, 2022", w/ English translation, 13 pgs.
"Chinese Application Serial No. 201880006129.X, Response filed Apr. 20, 2022 toOffice Action mailed Jan. 5, 2022", With Concise Statement, 10 pgs.
"Chinese Application Serial No. 202080047024.6, Office Action mailed Nov. 30, 2022", w/ English Translation, 16 pgs.
"European Application Serial No. 17835983.2, Response to Communication Pursuant to Rules 161(1) and 162 EPC filed Feb. 19, 2020", 11 pgs.
"European Application Serial No. 18713732.8, Response to Communication Pursuant to Rules 161(1) and 162 EPC filed Feb. 19, 2020", 25 pgs.
"European Application Serial No. 20775562.0, Response to Communication pursuant to Rules 161 and 162 filed Sep. 27, 2022", 23 pgs.
"European Application Serial No. 17835983.2, Communication Pursuant to Article 94(3) EPC mailed Aug. 24, 2021", 7 pgs.
"European Application Serial No. 17865596.5, Communication Pursuant to Article 94(3) EPC mailed Sep. 23, 2021", 6 pgs.
"European Application Serial No. 17865596.5, Extended European Search Report mailed Sep. 13, 2019", 11 pgs.
"European Application Serial No. 17865596.5, Response filed Apr. 9, 2020 to Extended European Search Report mailed Sep. 13, 2019", 21 pgs.
"European Application Serial No. 19769288.2, Response filed Sep. 29, 2021 to Communication Pursuant to Rules 161(1) and 162 EPC mailed Apr. 8, 2021", 24 pgs.
"European Application Serial No. 19845741.8, Response filed Feb. 3, 2022 to Communication Pursuant to Rules 161 and 162 EPC mailed Jul. 27, 2021", 19 pgs.
"European Application Serial No. 21153993.7, Extended European Search Report mailed May 12, 2021", 9 pgs.
"European Application Serial No. 23153345.6, Extended European Search Report mailed May 8, 2023", 9 pgs.
"European Application Serial No. 23160064.4, Extended European Search Report mailed Jun. 22, 2023", 7 pgs.
"International Application Serial No. PCT/US2017/058093, International Preliminary Report on Patentability mailed May 9, 2019", 6 pgs.
"International Application Serial No. PCT/US2017/058093, International Search Report mailed Jan. 4, 2018", 2 pgs.
"International Application Serial No. PCT/US2017/058093, Written Opinion mailed Jan. 4, 2018", 4 pgs.
"International Application Serial No. PCT/US2017/068988, International Preliminary Report on Patentability mailed Jul. 18, 2018", 8 pgs.
"International Application Serial No. PCT/US2017/068988, International Search Report mailed Apr. 5, 2018", 3 pgs.
"International Application Serial No. PCT/US2017/068988, Written Opinion mailed Apr. 5, 2018", 6 pgs.
"International Application Serial No. PCT/US2018/012967, International Preliminary Report on Patentability mailed Jul. 18, 2019", 8 pgs.
"International Application Serial No. PCT/US2018/012967, International Search Report mailed May 15, 2018", 5 pgs.
"International Application Serial No. PCT/US2018/012967, Written Opinion mailed May 15, 2018", 6 pgs.
"International Application Serial No. PCT/US2019/048597, International Preliminary Report on Patentability mailed Mar. 11, 2021", 10 pgs.
"International Application Serial No. PCT/US2019/048597, International Search Report mailed Dec. 2, 2019", 5 pgs.
"International Application Serial No. PCT/US2019/048597, Written Opinion mailed Dec. 2, 2019", 8 pgs.
"International Application Serial No. PCT/US2019/068007, International Preliminary Report on Patentability mailed Jul. 1, 2021", 17 pgs.
"International Application Serial No. PCT/US2019/068007, International Search Report mailed Apr. 30, 2020", 10 pgs.
"International Application Serial No. PCT/US2019/068007, Invitation to Pay Additional Fees mailed Mar. 11, 2020", 18 pgs.
"International Application Serial No. PCT/US2019/068007, Written Opinion mailed Apr. 30, 2020", 15 pgs.
"International Application Serial No. PCT/US2020/070158, International Preliminary Report on Patentability mailed Jan. 6, 2022", 14 pgs.
"International Application Serial No. PCT/US2020/070158, International Search Report mailed Dec. 17, 2020", 5 pgs.
"International Application Serial No. PCT/US2020/070158, Invitation to Pay Additional Fees mailed Oct. 1, 2020", 12 pgs.
"International Application Serial No. PCT/US2020/070158, Written Opinion mailed Dec. 17, 2020", 12 pgs.
"International Application Serial No. PCT/US2020/070230, International Preliminary Report on Patentability mailed Jan. 13, 2022", 16 pgs.
"International Application Serial No. PCT/US2020/070230, International Search Report mailed Nov. 5, 2020", 7 pgs.
"International Application Serial No. PCT/US2020/070230, Invitation to Pay Additional Fees mailed Sep. 15, 2020", 16 pgs.
"International Application Serial No. PCT/US2020/070230, Written Opinion mailed Nov. 5, 2020", 14 pgs.
"International Application Serial No. PCT/US2020/070503, International Preliminary Report on Patentability mailed Mar. 17, 2022", 9 pgs.
"International Application Serial No. PCT/US2020/070503, International Search Report mailed Dec. 2, 2020", 5 pgs.
"International Application Serial No. PCT/US2020/070503, Written Opinion mailed Dec. 2, 2020", 7 pgs.
"Korean Application Serial No. 10-2019-7014554, Final Office Action mailed May 25, 2021", w/ English Translation, 6 pgs.
"Korean Application Serial No. 10-2019-7014554, Notice of Preliminary Rejection mailed Nov. 27, 2020", w/ English Translation, 7 pgs.
"Korean Application Serial No. 10-2019-7014554, Response filed Jan. 27, 2021 to Notice of Preliminary Rejection mailed Nov. 27, 2020", w/ English Translation of Claims, 18 pgs.
"Korean Application Serial No. 10-2019-7014554, Response filed Jun. 25, 2021 to Final Office Action mailed May 25, 2021", w/ English Translation of Claims, 18 pgs.
"Korean Application Serial No. 10-2019-7023098, Notice of Preliminary Rejection mailed Oct. 8, 2020", w/ English translation, 15 pgs.
"Korean Application Serial No. 10-2019-7023098, Response filed Jan. 8, 2021 to Notice of Preliminary Rejection mailed Oct. 8, 2020", w/ English Claims, 19 pgs.
"Korean Application Serial No. 10-2021-7014739, Notice of Preliminary Rejection mailed May 29, 2021", w/ English translation, 9 pgs.
"Korean Application Serial No. 10-2021-7014739, Response filed Aug. 10, 2021 to Notice of Preliminary Rejection mailed May 29, 2021", w/ English claims, 17 pgs.
"Korean Application Serial No. 10-2021-7015384, Notice of Preliminary Rejection mailed Jun. 11, 2021", w/ English translation, 13 pgs.
"Korean Application Serial No. 10-2021-7015384, Response filed Oct. 7, 2021 to Notice of Preliminary Rejection mailed Jun. 11, 2021", w/ English Claims, 17 pgs.
"Korean Application Serial No. 10-2022-7005953, Notice of Preliminary Rejection mailed Apr. 4, 2022", w/ English Translation, 13 pgs.

(56) References Cited

OTHER PUBLICATIONS

"Korean Application Serial No. 10-2022-7005953, Response filed Aug. 3, 2022 to Office Action mailed Apr. 4, 2022", w/ English Claims, 20 pgs.
"Korean Application Serial No. 10-2022-7045427, Notice of Preliminary Rejection mailed Mar. 13, 2023", w/ English Translation, 15 pgs.
"Mirror my texture", C4dcafe, [Online] Retrieved from the Internet: <URL: https://www.c4dcafe.com/ipb/forums/topic/95957-mirror-my-texture/)>, (2016), 3 pgs.
"Mobile Keyboard", Unity User Manual, Website, historical copy retrieved from web archive: <https://web.archive.org/web/20181204043559/https://docs.unity3d.com/Manual/MobileKeyboard.html> on Apr. 20, 2021, (Dec. 4, 2018), 5 pgs.
Besancon, Lonni, "A Tangible Volume for Portable 3D Interaction", Youtube, [Online] Retrieved from the Internet: <URL: https://www.youtube.com/watch?v=LP7GG6t2j-g>, [Accessed May 28, 2021], (Sep. 28, 2016), 4 pgs.
Bikos, Marios, "Diploma Thesis(AR-Chess)—Gameplay (Virtual Object Manipulation)", Youtube, [Online] Retrieved from the Internet: <URL: https://www.youtube.com/watch?v=lpb3xHwgLfU>, [Accessed May 28, 2021], (Jul. 3, 2015), 2 pgs.
Deepu, R, et al., "3D Reconstruction from Single 2D Image", International Journal of Latest Research in Engineering and Technology (IJLRET), 2(1), (Jan. 2016), 42-51.
Fuccella, Vittorio, et al., "Gestures and Widgets: Performance in Text Editing on Multi-Touch Capable Mobile Devices", ACM, CHI '13: Proceedings of the SIGCHI Conference on Human Factors in Computing Systems, (Apr. 2013), 2785-2794.
Giaccone, P R, et al., "Foreground-background segmentation by cellular neural networks", IEEE 15th International Conference on Pattern Recognition (ICPR-2000), vol. 2, (2000), 438-441.
Kawai, Norihiko, et al., "Diminished Reality Based on Image Inpainting Considering Background Geometry", IEEE transactions on visualization and computer graphics, 22(3), (Mar. 1, 2016), 1236-1247.
Keeler, Alice, "Google Slides: Make a Draggable Stack", Teacher Tech with Alice Keeler, [Online] Retrieved from the Internet: <URL: https://alicekeeler.com/2017/04/10/google-slides-make-draggable-stack/>, (2017), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Long, et al., "Context-Aware Mixed Reality: A Framework for Ubiquitous Interaction", arXiv:1803.05541v1, Cornell University Library, Ithaca, NY, (Mar. 14, 2018), 11 pgs.
Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.
Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.
Park, Jong-Seung, et al., "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
Park, Jungsik, et al., "[Poster] Interactive deformation of real objects", 2014 IEEE International Symposium on Mixed and Augmented Reality (ISMAR), (Sep. 10, 2014), 295-296.
Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.
Ranganathan, Parthasarathy, et al., "Energy-Aware User Interfaces and Energy-Adaptive Displays", IEEE, Computer, vol. 39, Issue 3, (Mar. 20, 2006), 31-38.
Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.
Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/'bglocker/pdfs/salas-moreno2014ismar.pdf>, (Jan. 1, 2014), 8 pgs.
Schettini, R, et al., "A segmentation algorithm for color images", Pattern Recognition Letters, Elsevier, Amsterdam, NL, vol. 14, No. 6, (Jun. 1, 1993), 499-506.
Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.
Singh, Gurjinder, et al., "Ubiquitous hybrid tracking techniques for augmented reality applications", IEEE 2nd International Conference on Recent Advances in Engineering & Computational Sciences, (Dec. 21, 2015), 1-5.
Wang, Nanyang, et al., "Pixel2mesh: Generating 3d mesh models from single rgb images", Proceedings of the European Conference on Computer Vision (ECCV); arXIv:1804.01654v2 [cs.CV], (2018), 16 pgs.
Ward, Caleb, "5 Creative Ways to Use Layer Stacking in After Effects", RocketStock Blog, [Online] Retrieved from the Internet: <URL: https://www.rocketstock.com/blog/5-creative-ways-use-layer-stacking-effects/>, (2015), 9 pgs.
Yang, Jie, et al., "A Real-Time Face Tracker", Proceedings of the 3rd IEEE Workshop on Applications of Computer Vision (WACV'96), (Dec. 4, 1996), 142-147.
You, Suya, et al., "Hybrid Inertial and Vision Tracking for Augmented Reality Registration", Proceedings IEEE Virtual Reality (Cat. No. 99CB36316), (1999), 8 pgs.
"U.S. Appl. No. 17/527,376, Examiner Interview Summary mailed Jul. 29, 2024", 2 pgs.
"U.S. Appl. No. 17/527,376, Examiner Interview Summary mailed Aug. 23, 2024", 2 pgs.
"U.S. Appl. No. 17/527,376, Final Office Action mailed Aug. 8, 2024", 23 pgs.
"U.S. Appl. No. 17/527,376, Response filed Jul. 26, 2024 to Non Final Office Action mailed Apr. 26, 2024", 10 pgs.
"U.S. Appl. No. 18/073,280, Corrected Notice of Allowability mailed Aug. 14, 2024", 2 pgs.
"U.S. Appl. No. 18/073,280, Corrected Notice of Allowability mailed Aug. 28, 2024", 2 pgs.
"Chinese Application Serial No. 201980056286.6, Office Action mailed Jul. 20, 2024", w/ English translation, 16 pgs.
"European Application Serial No. 19845741.8, Communication Pursuant to Article 94(3) EPC mailed Jul. 10, 2024", 7 pgs.
"Korean Application Serial No. 10-2023-7040211, Notice of Preliminary Rejection mailed Jul. 3, 2024", w/ English translation, 14 pgs.
"Korean Application Serial No. 10-2024-7010515, Notice of Preliminary Rejection mailed Aug. 28, 2024", w/ English translation, 6 pgs.
"Chinese Application Serial No. 201980056286.6, Response Filed Sep. 10, 2024 to Office Action mailed Jul. 20, 2024", w English Claims, 15 pgs.

\* cited by examiner

3D OBJECT CAMERA CUSTOMIZATION SYSTEM

CLAIM OF PRIORITY

This application is a continuation of U.S. patent application Ser. No. 17/817,491, filed on Aug. 4, 2022, which is a continuation of U.S. patent application Ser. No. 17/249,092, filed on Feb. 19, 2021, which is a continuation of U.S. patent application Ser. No. 16/457,461, filed on Jun. 28, 2019, now issued as U.S. Pat. No. 11,189,098, each of which are incorporated herein by reference in their entireties.

TECHNICAL FIELD

The present disclosure relates generally to visual presentations of virtual content and, more particularly, to rendering a three-dimensional object within a real-world environment captured in a camera feed of a computing device.

BACKGROUND

Virtual rendering systems can be used to create engaging and entertaining augmented reality experiences, in which three-dimensional (3D) virtual object graphics content appear to be present in the real-world. Such systems allow a user to select from a predefined list of 3D objects and display the selected 3D objects in the view of a camera feed.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 8-12A and 12B are interface diagrams that illustrate various interfaces provided by the messaging system, according to some example embodiments.

DETAILED DESCRIPTION

Figure 1:
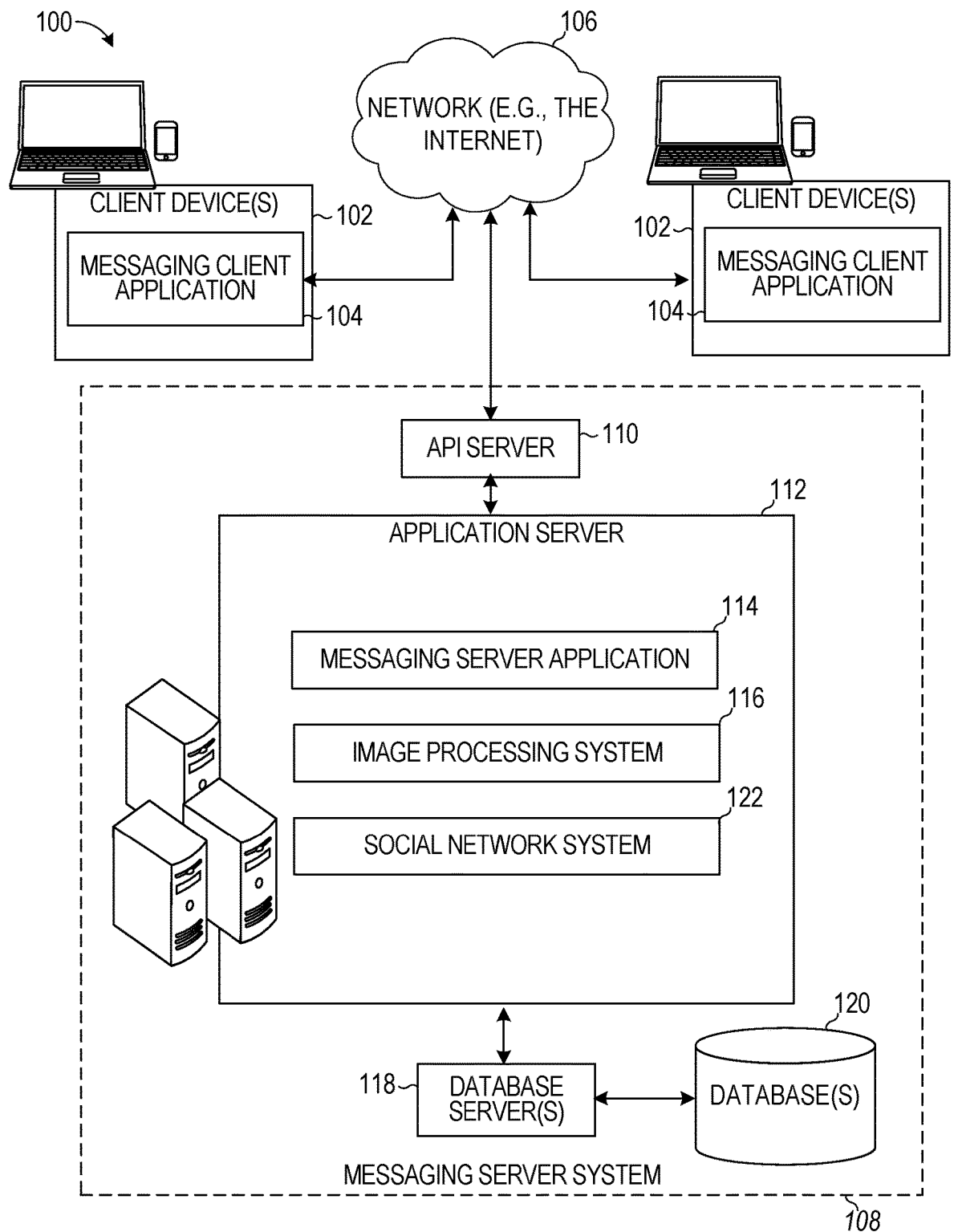
FIG. 1 is a block diagram showing a messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Users are always seeking new ways to interact with content as if it exists in the real world. Typical augmented reality systems enable a user to insert a virtual object into a video frame and control its position in the real-world environment depicted in the video frame. However, simply inserting a virtual object into a video frame without considering other objects (e.g., surfaces) in the video frame makes the resulting video frame with the virtual object look unrealistic, particularly because depth of the object cannot be utilized. Some systems allow a user to choose from a predefined list of virtual objects to insert into a real-word environment that is depicted in a camera feed (e.g., a live video received from a camera). While such systems generally work well in presenting such objects in the real-world environment, the lack of ability to customize and manipulate the objects makes the systems less appealing and less interesting to users.

Among other things, embodiments of the present disclosure improve the functionality of electronic messaging and imaging software and systems by providing functionality that allows users to modify surface textures of a virtual object, such as a three-dimensional (3D) caption or two-dimensional (2D) caption, user generated content, pre-generated content, curated content, geofilter, picture, lens, graphical objects, stickers, emojis, and a GIFs to represent portions of an image depicting a first real-world environment. Specifically, portions of the virtual object a user inserts can be transparent or partially transparent to reveal and represent the underlying, images of the real-world environment and/or modified to include other images of the real-world environment, such as using additional camera feeds. The virtual objects having the modified surface textures representing the portions of the image depicting the first real-world environment are then rendered, as if they exist in other real-world environments and/or in other viewpoints of the real-world environment. In this way, the disclosed embodiments create a new and more engaging ways for users to communicate with each other. Namely, rather than exchanging messages using predetermined objects that the user cannot manipulate or personalize, the disclosed embodiments allow users to create virtual objects having surface environment representations with personalized content (e.g., messages).

The disclosed embodiments allow the users to modify the virtual objects such that the graphical properties (e.g., the visual attributes, such as colors and textures) of the created virtual objects represent the real-world environment of the user who is creating the message. This enables the user to convey information to other users using messaging that have enriched content. The graphical user interface functions, according to the disclosed embodiments, enable easy generation of an environment-based virtual object from within a messaging application, and without requiring sophisticated photo-editing skills from the user.

In some embodiments, a first real-world environment content item, such as images and/or video of a sandy beach, the ocean and the sky, generated by an image-capturing device (e.g., a digital camera) is displayed and 2D/3D text can be displayed in on top of a portion of the first real-world environment content, such as on top of the beach. The surface of the text (e.g., the colors of the characters of the text) is modified using the colors and patterns of the portion of the first real-world environment over which the text is displayed to appear as if the text is at least partially transparent, revealing the underlying real-world environment. Specifically, a surface texture of one character of the text that is displayed over the sandy beach is modified to be at least partially transparent in a way that represents the color and pattern of the sand (e.g., sandy white) and a surface texture of another character of the text that is displayed over the ocean is similarly modified to represent the color of the ocean (e.g., a wavy blue). The text with the modified surface texture is stored and sent to another user for presentation on top of a second real-world environment depicted in an image, such as an environment depicting an office scene. This way, the text with the mixture of a sandy white beach and ocean colored characters of the first real-world environment is presented and can be moved around in an image depicting the office scene in the second real-world environment. According to the disclosed embodiments, a first user who is located at the first real-world environment (e.g., the beach) can convey a textual message to a second user, who may be in the office (another real-world environment) that is enriched with visual attributes of the first user's surroundings (e.g., the beach). This significantly enhances the meaning of the message the first user is trying to convey to the second user.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

In some embodiments, the messaging client application 104 presents a graphical user interface to a user for selecting or creating a virtual surface environment representation object, such as a 3D surface environment representation object and/or a 2D surface environment representation object. A user can activate a camera of the messaging client application 104 to view in real-time images of the user's real-world surroundings/environment (e.g., the camera feed). The user can instruct the messaging client application 104 to add a virtual object to real-world images being captured by the camera at a user selected position. The position can be selected in 3D and/or 2D space. Specifically, the user can manipulate the virtual object to reposition the virtual object relative to the real-world objects.

In some embodiments, the messaging client application 104 receives user input to modify the added virtual object to be a virtual surface environment representation object. Namely, after or before the user positions the virtual object within the real-world environment depicted in the real-time images, the user can tap on the screen or make another suitable gesture to instruct the messaging client application 104 to modify the surface texture of the virtual object using the underlying visual attributes of the real-world environment over which the virtual object is positioned. In an embodiment, the messaging client application 104 changes a transparency of the surface pixels of the virtual object such that pixels within a border of the virtual object represent the underlying portions of the image of the real-world environment over which the virtual object is positioned. The user can then instruct the messaging client application 104 to change the position of the virtual object in 2D/3D space. As the virtual object with the modified surface texture is repositioned, the surface texture can continuously be updated to continue representing the underlying portions of the image of the real-world over which the object is positioned in real-time. In this way, as the user moves the object around, all pixels within the border of the object continue to show in a partially transparent manner the pixels of the real-world environment over which the pixels within the border of the object are positioned.

After the object is placed in 2D/3D space over the image portions depicting the real-world environment, the user can instruct the messaging client application 104 to capture and store the surface textures of the virtual object in their present state. Namely, the pixels of the surface textures of the virtual object are maintained at their present value depicting in a partially transparent manner portions of the real-world environment over which they are positioned. After the messaging client application 104 captures and stores the current state of the surface textures, the virtual object becomes locked in a way that allows the user to continue manipulating the position in 2D/3D space within the real-world environment depicted in the camera feed. But now, as the locked virtual object is moved around, the surface textures no longer are updated and modified to represent the underlying images of the real-world environment.

As an example, the real-world environment depicted in the camera feed includes the ocean, a sandy beach, trees and the sky. A user can position a 2D/3D virtual object, such as a caption with text, within the real-world environment. Specifically, a first set of letters of the virtual object can be positioned over the ocean and a second set of letters of the virtual object can be positioned over the sandy beach. The messaging client application 104 can be instructed to modify the surface textures of the virtual object to generate a surface environment representation object. In response, the first set of letters can become partially transparent to reveal the ocean over which they are positioned (e.g., the pixel values over which the first set of letters are positioned are copied into the pixel vales of the pixels within a border of the first set of letters). Similarly, the second set of letters can become partially transparent to reveal the sandy beach over which they are positioned (e.g., the pixel values over which the second set of letters are positioned are copied into the pixel vales of the pixels within a border of the second set of letters). The user can manipulate the position of the caption and the pixel values within the borders of the letters continue to be updated to represent (e.g., show, display, have an appearance based on) the underlying image portions over which they are positioned in a partially transparent manner.

In some embodiments, a surface texture/appearance of the virtual object can be generated to simulate a reflective (e.g., mirror-like) surface located in the first environment (e.g., instead of being based on partial transparency. For example, the surface texture/appearance of the virtual object can represent content items within the environment that are in front of the virtual object (rather than behind the virtual object) relative to the virtual object's position in the 3D space.

The user can instruct the messaging client application 104 to lock the current state of the virtual object. In response, as the user moves the virtual object around the real-world environment, the surface texture and pixel values are no longer updated. In this way, the first set of letters, with the surface texture of the ocean, can be moved to be positioned over the beach within the real-world environment but continue to show the surface texture of the ocean. Also, the second set of letters, with the surface texture of the beach, can be moved to be positioned over the sky within the real-world environment but continue to show the surface texture of the beach. Specifically, the first and second set of letters are no longer in a partially transparent state and can be moved around to other portions of the real-world environment in a way that obscures the portions over which they are positioned using the pixel values of the letters when the letters were positioned last over the portion of the environment when the letters were in a partially transparent state.

In some embodiments, the user can capture, store and share the virtual surface environment representation object with another user of another messaging client application 104. For example, a second user who is within a real-world office environment can activate a camera feed. The second user can add the received virtual surface environment representation object into a camera feed depicting real-time images of the second user's surroundings (e.g., the office environment). In some cases, the received virtual surface environment representation object is automatically placed into the camera feed when the object is received by the second user. Namely, upon the second user receiving the virtual surface environment representation object from another user, the camera feed of the second user is automatically activated and displays the received virtual surface environment representation object. In some cases, the second user receives the virtual surface environment representation object by way of a message (which may or may not include an indication that the message includes a virtual surface environment representation object). In response to the second user selecting the message (e.g., the user opens the message to view its contents), the virtual surface environment representation object is retrieved and displayed automatically in the camera feed of the second user. In this way, the second user can view the text, generated by the first user while the first user was at the beach environment and with the surface textures of the beach environment, in the office environment. The second user can move around the surface environment representation object within the office environment depicted in the real-time images. This results in the second user viewing characters that show partially images of the ocean and the sand from the first user's real-world environment within the images of the second user's environment.

In some embodiments, the user can instruct the messaging client application 104 to add a virtual object, such as a hat, to the user's real-world environment depicted in real-time images captured by an initial camera feed of the user's device. For example, the real-world environment depicted in the images includes a head of a person. The user can instruct the messaging client application 104 to add a virtual object, such as a hat, to the real-world environment and the user can position the virtual object on top of the head. Specifically, the messaging client application 104 can place the virtual hat on top of the person's head in the real-world environment. The user can activate the surface environment representation lens feature of the messaging client application 104 and can select a portion of the virtual object to be modified. For example, the user can draw a shape to be modified to represent the user's real-world environment and/or the messaging client application 104 can modify predetermined portions of the virtual object, such as the front of the hat, to represent the real-world environment. In an embodiment, the messaging client application 104 can activate another camera, such as another front facing camera or rear facing camera. The messaging client application 104 can receive real-time images of the activated camera and insert the received images into the portion of the virtual object selected to be modified to represent the real-world environment.

After the virtual object is placed in 2D/3D space over the image portions depicting the real-world environment and after the user is satisfied with the real-time images received from the additional camera that are presented on the virtual object, the user can instruct the messaging client application 104 to capture and store the surface textures of the virtual object in their present state. Namely, the currently received image from the additional camera is stored and maintained in the position on the virtual object. The user to continue manipulating the position in 2D/3D space within the real-world environment depicted in the initial camera feed. But now, as the locked virtual object is moved around, the surface textures no longer are updated and modified to represent the images of the additional camera. For example, the front of the virtual hat depicting the last image received from the additional camera feed can be moved around to other portions of the real-world environment depicted in the initial camera feed. The user can also send this virtual object to another user for presentation and manipulation in the second user's environment or a different camera feed.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
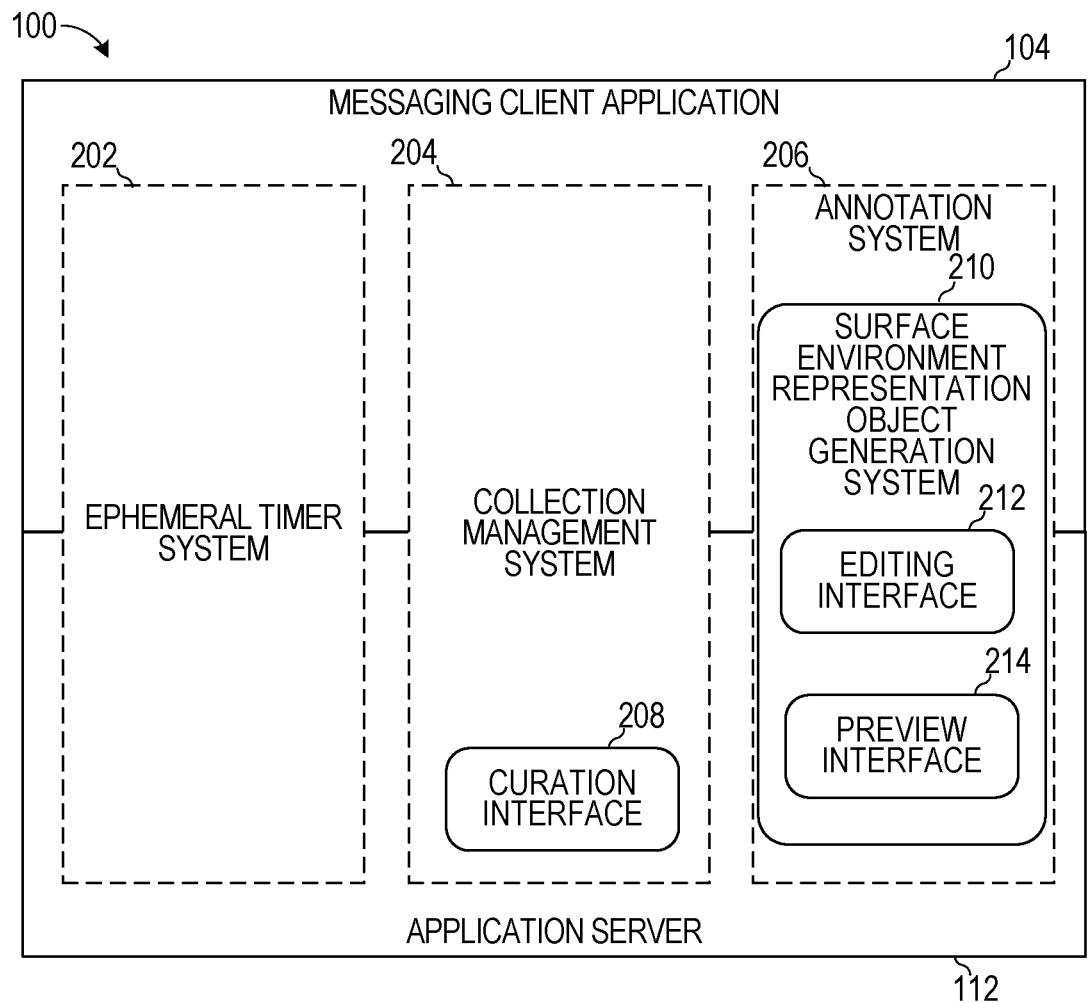
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter or lens) to the messaging client application 104. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying.

The audio and visual content or the visual effects can be applied to a media content item (e.g., a photo) at the client device 102. For example, the media overlay including text that can be overlaid on top of an image or video generated by the client device 102. In another example, the media overlay includes an identification of a location overlay (e.g., Venice beach), a name of a live event, or a name of a merchant overlay (e.g., Beach Coffee House).

The annotation system 206 includes a surface environment representation object generation system 210 that provides functionality to receive a virtual object (e.g., a virtual object with transparency type of surface environment representation or a virtual object with a region in which additional camera feeds are presented) and generate a virtual surface environment representation object, from the received virtual object, and display and track the virtual surface environment representation object, at positions relative to the client device 102, within a 2D/3D space captured within a camera feed of the client device 102 (also referred to by those of ordinary skill in the art as a "camera stream," "a video stream," or a "video feed"). The virtual surface environment representation objects generated, displayed, and tracked by the surface environment representation object generation system 210 include virtual surface environment representation objects generated and modified to represent portions of a real-world environment over which the objects are positioned in an image depicting the real-world environment. A virtual surface environment representation object represents any user generated content, curated content, images, text, video, captions, animation or other visual item selected by a user or automatically identified that has surface textures that depict image portions captured by one or more cameras of a user device.

The surface environment representation object generation system 210 provides functionality to enable users to author, edit, and preview virtual surface environment representation objects by supplying a virtual object and positioning the object over a desired portion of an image that depicts a real-world environment. The real-world environment can be a pre-recorded video, a pre-captured image, a real-time video, or a real-time image. To this end, the surface environment representation object generation system 210 includes an editing interface 212 and a preview interface 214. The editing interface 212 allows a user to author and select a virtual object (e.g., the user can select a 2D/3D image, 2D/3D graphical element or avatar, or video from a list or can manually type in a set of characters corresponding to text or a caption).

The editing interface 212 enables users to edit the virtual object using keyboard input and other types of input including touch screen based gestures. For example, the user can change the scale, color scheme, size or any other visual attribute of the virtual object. After the user is satisfied with the edited virtual object, the user can instruct the surface environment representation object generation system 210 to create a virtual surface environment representation object from the virtual object input by the user. The preview interface 214 allows a user to preview and review the generated virtual surface environment representation object before generating a message that includes the virtual surface environment representation object. The preview interface 214 may also enable the user to edit the presentation of the virtual surface environment representation object (e.g., by changing a scale, orientation, or placement in 2D/3D space of the virtual surface environment representation object on the display screen). The surface environment representation object generation system 210 creates the virtual surface environment representation object from the virtual object selected by the user in accordance with the process described in connection with FIGS. 6 and 7.

The surface environment representation object generation system 210 may cause a virtual surface environment representation object to be displayed (e.g., on a display of the client device 102) at positions in a 3D space captured within the camera feed based on a reference surface (e.g., the ground) detected in the 3D space. As will be discussed in further detail below, the surface environment representation object generation system 210 comprises a redundant tracking system comprising a set of tracking subsystems configured to track a virtual surface environment representation object at positions in 2D/3D space based on a set of tracking indicia, and transition between tracking subsystems. The surface environment representation object generation system 210 may further transition between tracking with six degrees of freedom (6DoF) and tracking with three degrees of freedom (3DoF) based on an availability of the tracking indicia.

Figure 3:
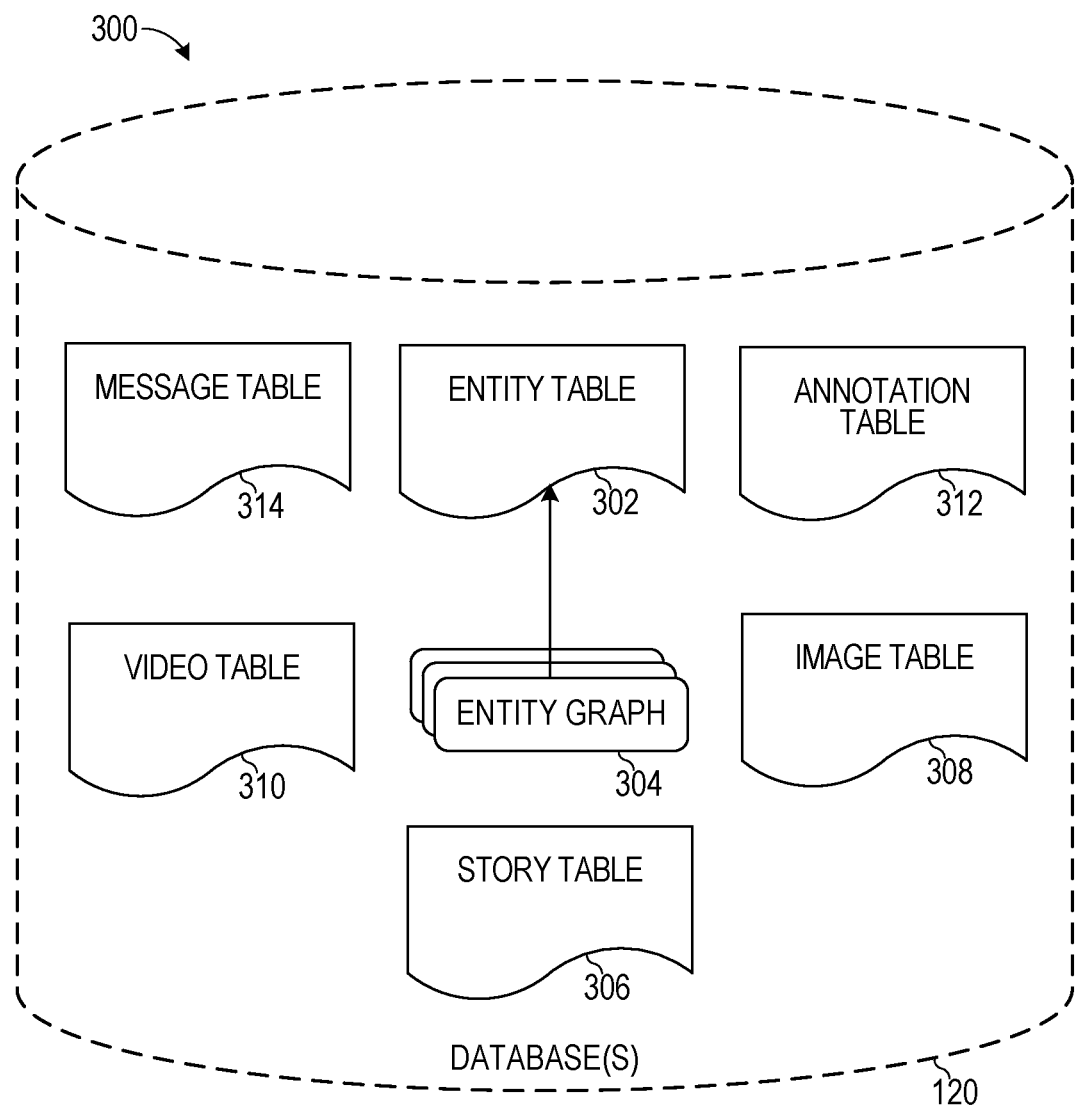
FIG. 3 is a schematic diagram illustrating data which may be stored in the database of the messaging server system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, 2D and/or 3D objects, 3D object templates, 3D object textures, places, events, virtual objects configured to have at least a predetermined portion be in a transparent, partially transparent, or locked state, virtual objects configured with selectable or predetermined portions for representing additional camera feeds, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and lenses, in an annotation table 312. Filters and lens for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. Lens, on the other hand, include real-time special effect and/or sounds that may be added to images of a camera feed while a user is composing a message. In comparison, filters are applied to an image or video after the image or video is captured at the client device 102 while a lens is applied to the camera feed of the client device 102 such that when an image or videos is captured at the client device 102 with a lens applied, the applied lens is incorporated as part of the image or video that is generated. Filters and lenses may be of various types, including user-selected filters and lens from a gallery of filters or a gallery of lenses presented to a sending user by the messaging client application 104 when the sending user is composing a message. Any functionality described with respect to filters is equally applicable to lens and vice versa.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices have location services enabled and are at a common location event at a particular time, may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
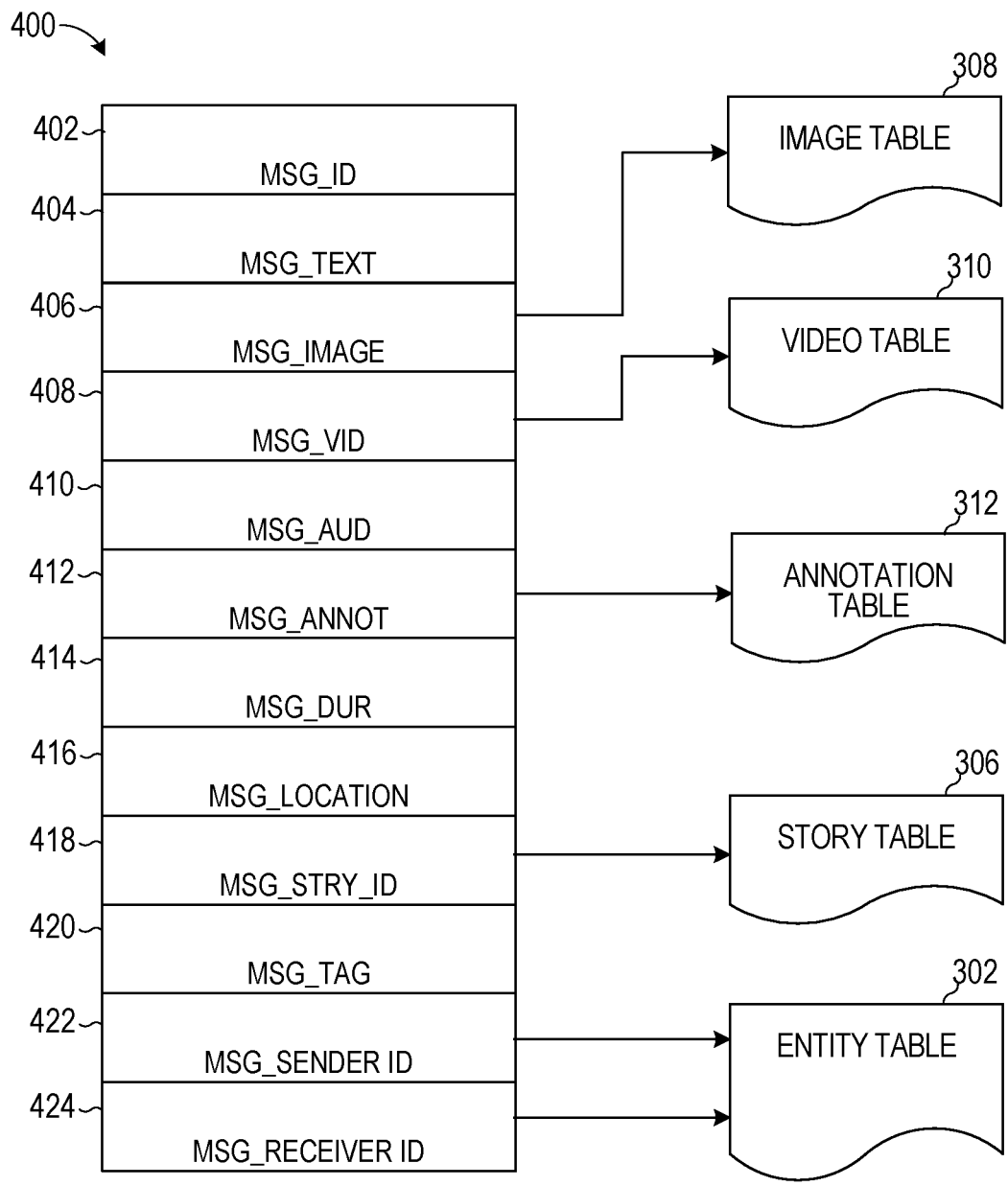
FIG. 4 is a schematic diagram illustrating a structure of a message generated by a messaging client application for communication, according to example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
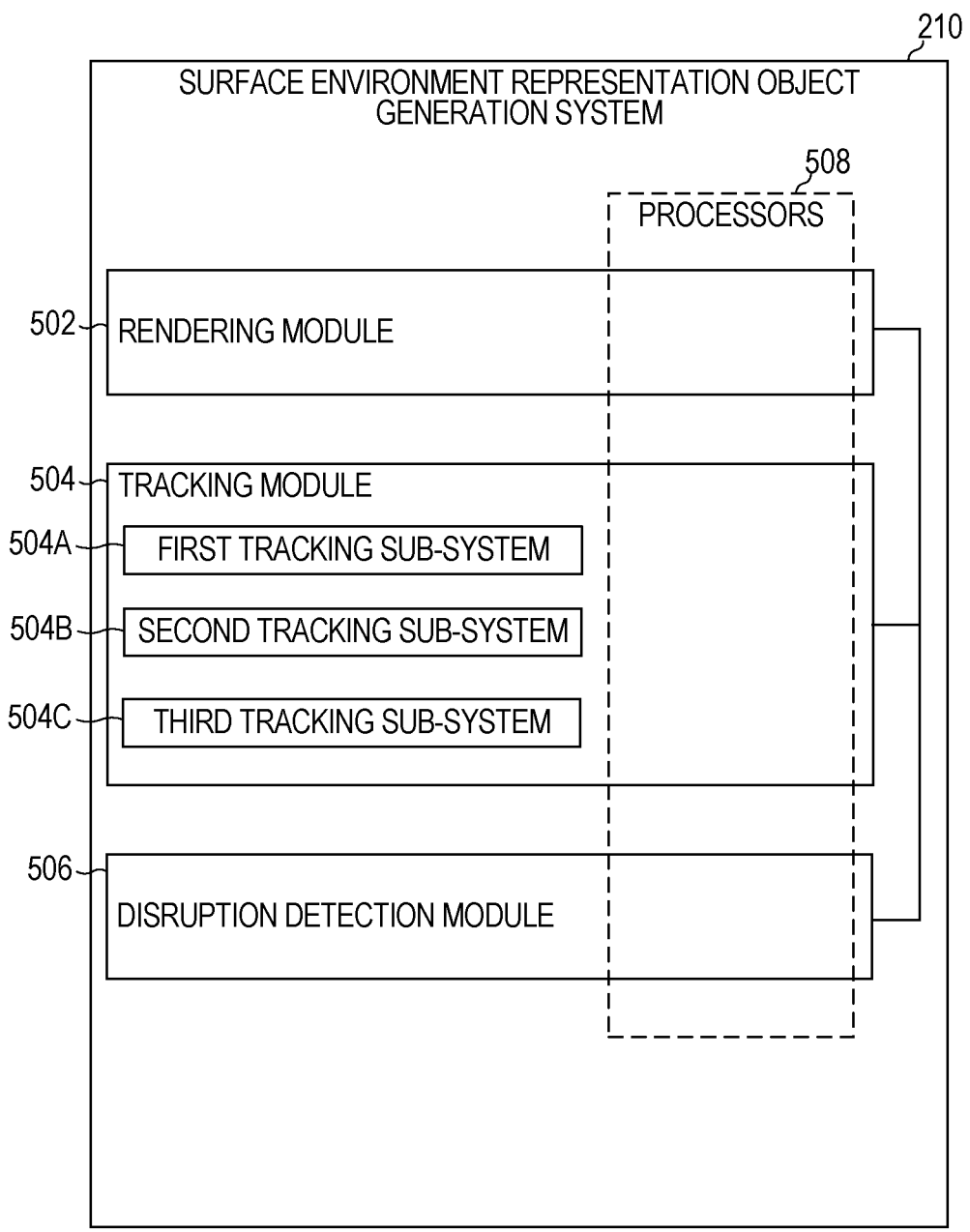
FIG. 5 is a block diagram illustrating various components of a surface environment representation object generation system, which may be provided as part of the messaging system, according to example embodiments.

FIG. 5 is a block diagram illustrating functional components of the surface environment representation object generation system 210 that configures the surface environment representation object generation system 210 to render surface environment representation objects from virtual objects in a 2D/3D space depicted in a live camera feed. The surface environment representation object generation system 210 is shown as including a rendering module 502, a tracking module 504, and a disruption detection module 506. The various components and modules of the surface environment representation object generation system 210 may be configured to communicate with each other (e.g., via a bus, shared memory, or a switch). Although not illustrated in FIG. 5, in some embodiments, the surface environment representation object generation system 210 may include or may be in communication with one or more cameras (e.g., one or more front-facing cameras and/or one or more rear-facing cameras) configured to produce a camera feed comprising image data that includes a sequence of images (e.g., a video). In an embodiment, depending on the type of virtual object selected by the user, the surface environment representation object generation system 210 may activate multiple of the cameras on the user device. A first camera may be activated to display real-time images of the user's real-world environment in full screen and a second camera may be activated to display real-time images of the user's real-world environment on a dedicated or user selected portion of a virtual object positioned within the feed from the first camera.

Any one or more of the components and modules described may be implemented using hardware alone (e.g., one or more of the processors 1404 of a machine) or a combination of hardware and software. For example, any component and modules described of the surface environment representation object generation system 210 may physically include an arrangement of one or more of the processors 1404 (e.g., a subset of or among the one or more processors of the machine) configured to perform the operations described herein for that component. As another example, any component and module of the surface environment representation object generation system 210 may include software, hardware, or both, that configure an arrangement of one or more processors 1404 (e.g., among the one or more processors of the machine) to perform the operations described herein for that component. Accordingly, different components and modules of the surface environment representation object generation system 210 may include and configure different arrangements of such processors 1404 or a single arrangement of such processors 1404 at different points in time.

Moreover, any two or more components and modules of the surface environment representation object generation system 210 may be combined into a single component or module, and the functions described herein for a single component or module may be subdivided among multiple components and modules. Furthermore, according to various example embodiments, components and modules described herein as being implemented within a single machine, database, or device may be distributed across multiple machines, databases, or devices.

The tracking system 504 may comprise a first tracking sub-system 504A, a second tracking sub-system 504B, and a third tracking sub-system 504C. Each tracking sub-system tracks the position of a surface environment representation object within the 2D/3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization and Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with 3DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the surface environment representation object generation system 210 comprises multiple redundant tracking sub-systems 504A-C that enable seamless transitions between tracking sub-systems. The multiple redundant tracking sub-systems 504A-C address the issues with traditional tracking systems by merging multiple tracking approaches into a single tracking system 504. The tracking system 504 is able to combine 6DoF and 3DoF tracking techniques through combining and transitioning between multiple tracking systems based on the availability of tracking indicia (e.g., roll, pitch, yaw, natural features, etc.) tracked by the tracking systems. Thus, as the indicia tracked by any one tracking system becomes unavailable, the surface environment representation object generation system 210 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the surface environment representation object generation system 210 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

The rendering module 502 of the surface environment representation object generation system 210 is configured to obtain a virtual object and generate and render surface environment representation objects from the obtained virtual object in a 3D space captured within a live camera feed produced by a camera. In rendering the surface environment representation object, the surface environment representation object generation system 210 assigns the surface environment representation object to a position in the 2D/3D space based on a real-world reference surface detected in the 2D/3D space.

The surface environment representation object generation system 210 may thereafter track the position of the surface environment representation object relative to a user device in the 3D space by one or more tracking systems in 6DoF. For example, the one or more tracking systems of the surface environment representation object generation system 210 may collect and analyze a set of tracking indicia (e.g., roll, pitch, yaw, natural features, etc.) in order to track the position of the surface environment representation object relative to the user device in the 2D/3D space with 6DoF. In such embodiments, the surface environment representation object generation system 210 may transition between tracking systems based on the availability of the tracked indicia to maintain consistent tracking in 6DoF.

The disruption detection module 506 monitors tracking indicia to detect disruptions. Upon the disruption detection module 506 detecting an interruption of one or more indicia, such that tracking in 6DoF becomes unreliable or impossible, the surface environment representation object generation system 210 transitions to tracking the surface environment representation object in the 2D/3D space in 3DoF in order to prevent an interruption of the display. For example, the surface environment representation object generation system 210 may transition from a first tracking sub-system 504A (or first set of tracking sub-systems among the set of tracking sub-systems) that track the object in 6DoF to a second tracking sub-system 504B among the set of tracking sub-systems (or second set of tracking sub-systems), wherein the second tracking system is capable of tracking the surface environment representation object with 3DoF in the 3D space, based on the tracking indicia available.

In some example embodiments, the set of tracking systems of the surface environment representation object generation system 210 comprises a gyroscopic tracking system, an NFT system, and a SLAM tracking system. Each tracking system among the set of tracking systems may analyze tracking indicia to track a position of a virtual object within a 3D space. For example, to track a virtual object with 6DoF, the surface environment representation object generation system 210 may require at least six tracking indicia to be available. As tracking indicia become obstructed or unavailable for various reasons, the surface environment representation object generation system 210 may transition between the available tracking systems among the set of tracking systems in order to maintain 6DoF, or transition to 3DoF if necessary.

It will be readily appreciated that the surface environment representation object generation system 210 provides consistent rendered surface environment representation objects (e.g., 3D captions, avatars, or 3D animations, videos or images) in real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

To ensure firm consistency in the location of virtual objects, annotation data in the example form of a presentation lens that is specific for the surface environment representation object tracking and rendering described herein may be employed. In particular, a surface aware lens is a presentation lens that identifies and references a real-world surface (e.g., the ground) for the consistent rendering and presentation of surface environment representation objects in 3D space. The surface aware lens can be a specific portion or submodule within the rendering module 502. This surface aware lens of the rendering module 502 can be configured to recognize a reference surface based on visual camera content, and may also utilize other device inputs (e.g., gyroscope, accelerometer, compass) to determine what is an appropriate surface within a 3D space depicted in a live camera feed. Once the reference surface has been determined, then virtual surface environment representation object can be positioned with respect to that reference surface. In an example, the reference surface in the 3D space is a ground surface. In this example, the surface environment representation object generation system 210 renders the surface environment representation object at a position in the 3D space such that the surface environment representation object appears to be on or slightly above the 3D space. The surface environment representation object rendered by the surface environment representation object generation system 210 includes surface textures of a first real-world environment over which the surface environment representation object was positioned in an image. In some embodiments, the surface environment representation object rendered by the surface environment representation object generation system 210 includes surface textures of another camera feed depicting other portions of the real-world environment in which the surface environment representation object was positioned in an image. Such an object is stored and used by the surface environment representation object generation system 210 to track and render the surface environment representation object of the first real-world environment in a second real-world environment depicted in another image on the same or different user device.

Figure 6:
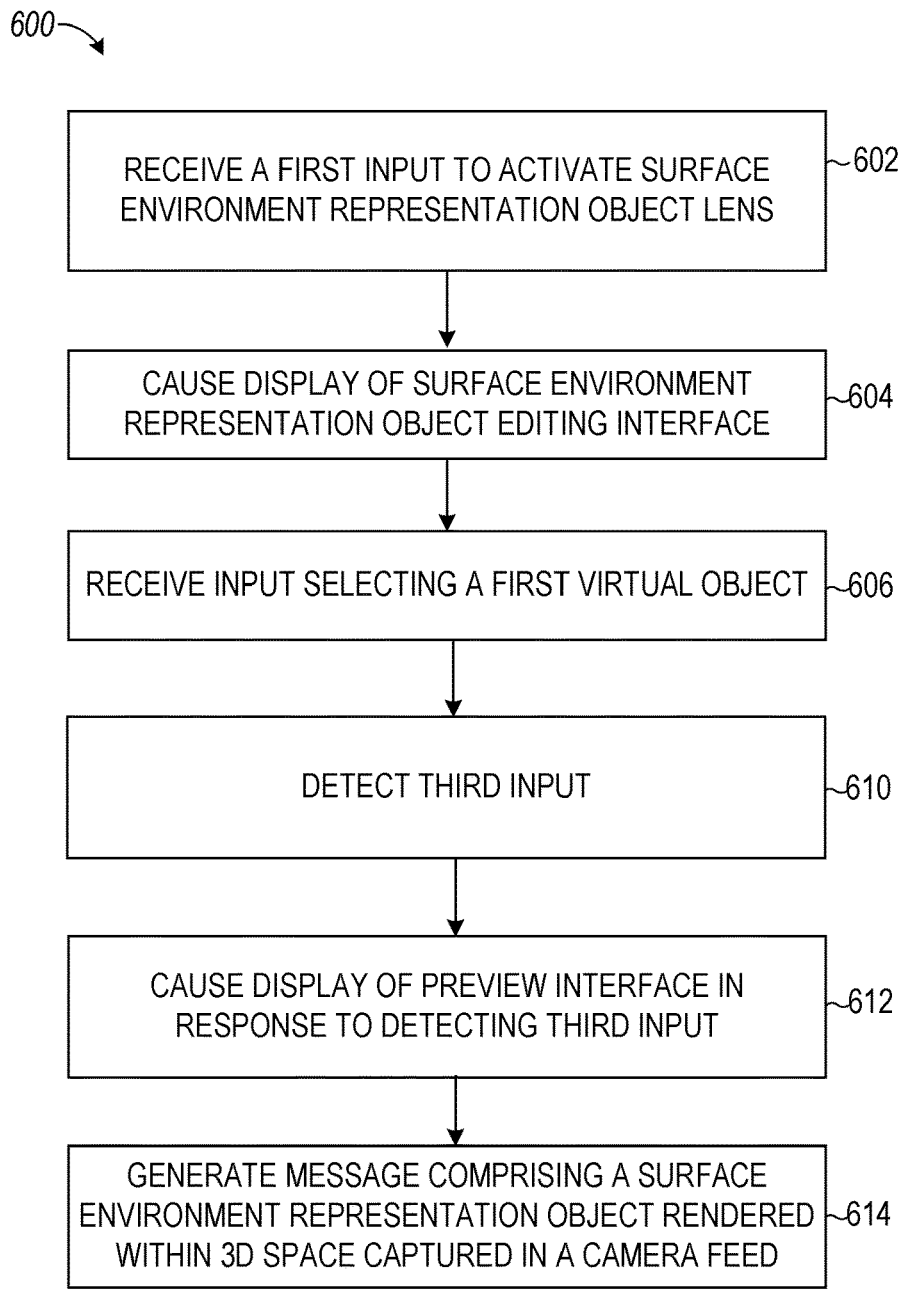
FIGS. 6 and 7 are flowcharts illustrating example operations of the surface environment representation object generation system in performing a method for generating a message that includes a surface environment representation object, according to example embodiments.
Figure 7:
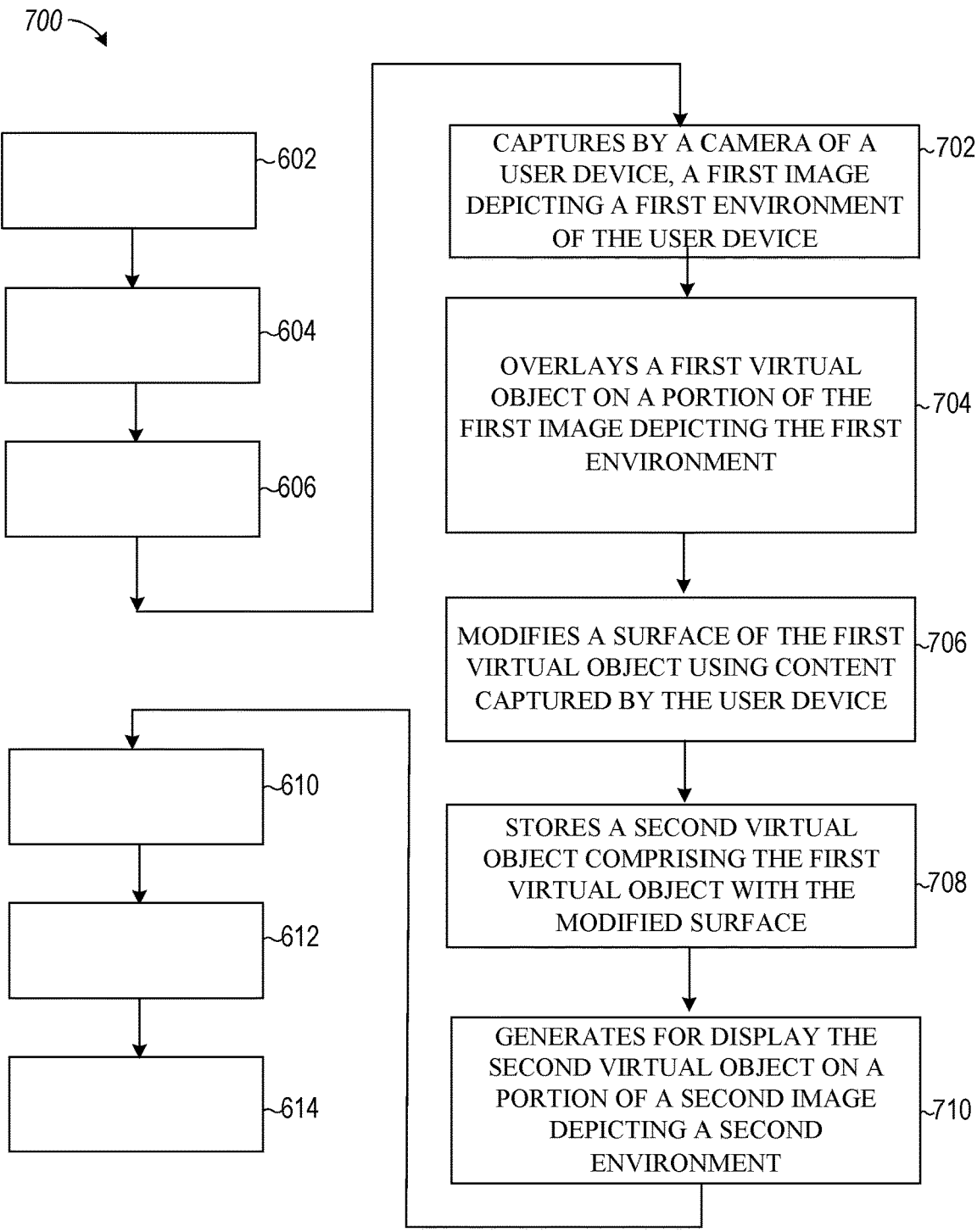

FIGS. 6 and 7 are flowcharts illustrating example operations of the surface environment representation object generation system in performing methods 600 and 700 for generating a message that includes a surface environment representation object, according to example embodiments. The methods 600 and 700 may be embodied in transitory or non-transitory computer-readable instructions for execution by one or more processors such that the operations of the methods 600 and 700 may be performed in part or in whole by the functional components of the surface environment representation object generation system 210; accordingly, the methods 600 and 700 are described below by way of example with reference thereto. It shall be appreciated, however, that at least some of the operations of the methods 600 and 700 may be deployed on various other hardware configurations and the methods 600 and 700 are not intended to be limited to the surface environment representation object generation system 210. Any one of the operations described in connection with methods 600 and 700 may be performed in a different order than that shown and described or entirely omitted.

At operation 602, the annotation system 206 receives a first input to activate a surface representation object lens. The surface representation object lens may be selected from a group of lenses. For example, a list of several lens is presented over a real-time feed from a camera and the user can tap a given lens in the list to instantly add the lens to the real-time feed. As one example, the user can tap the surface representation object lens to view a list of available surface representation object lens types or objects that the user can selected from at operation 604.

At operation 604, the surface environment representation object generation system 210 causes display of an editing interface 212 on the client device 102. The editing interface 212 enables a user to input a selection of a virtual object and modifications or edits to the virtual object that provide a basis for generating a surface environment representation object from the virtual object. In some embodiments, the virtual object that is selected by the user is a 2D or 3D object and the surface environment representation object that is generated is a 2D/3D object. To this end, the editing interface 212 may include a keyboard or other input mechanism to enable the user to input a selection of 2D/3D content (e.g., the one or more text characters, image selection, video selection, animation selection, and so forth). The 2D/3D content input by the user is displayed as a 2D/3D overlay on top of a camera feed produced by a camera of the client device 102. The camera feed presents a first real-world environment of the client device 102.

At operation 606, the surface environment representation object generation system 210 receives input selecting a first virtual object by a user of the client device using the editing interface 212. The input may adjust the position of the 2D/3D object in the first real-world environment such that the 2D/3D object overlays different portions of the first real-world environment depicted in the camera feed. For example, the user can select a virtual object that includes a portion that is configured to be in a partially-transparent state or a locked state. Specifically, the virtual object can be a caption region that adds characters one at a time as the user types in the characters of the caption. Each character may include a border and pixels within the border are configured to be at least partially transparent to reveal and show the portions of the real-world environment over which the characters are positioned. As additional characters are input and/or as the caption is moved around in 2D/3D space in the real-time camera feed, the pixels within the borders of the characters are updated such that the surface textures in a way that is partially transparent to reveal the portions of the real-world environment over which they are positioned.

The user can input an instruction to lock the state of the virtual object such that the current pixel values representing in the partially transparent manner the portion of the real-world environment over which they are positioned are locked. This allows the user to manipulate the position and orientation of the virtual object in 2D/3D space without having the pixel values updated and without having the surface textures continue updating to represent in a partially transparent manner the underlying portions of the real-world environment. This way, the virtual object can represent with its surface textures a first portion of the real-world environment over which the object was positioned when the pixels were in a partially transparent state while being positioned over a different portion of the real-world environment depicted in the real-time camera feed.

As another example, the user can select a virtual object that includes a portion dedicated or selectable to represent images from another real-time camera feed. Specifically, the virtual object can be positioned within 2D/3D space in the real-time camera feed received from a first camera (e.g., a front-facing camera) and a portion of the surface textures of the virtual object can be modified with content received from a real-time camera feed received from a second camera (e.g., a rear-facing or front facing camera). The user can dynamically change whether the front or rear-facing camera is used to provide the content for the surface textures of the virtual object. The user can input an instruction to lock the state of the virtual object such that the current pixel values representing in the currently received content of the second real-time camera feed are locked. This allows the user to manipulate the position and orientation of the virtual object in 2D/3D space without having the pixel values updated and without having the surface textures continue updating to represent the content received from the second real-time camera feed. This way, the virtual object can represent with its surface textures a first portion of the real-world environment over which the object was positioned when the pixels were being updated with the second camera feed while being positioned over a different portion of the real-world environment depicted in the first real-time camera feed.

At operation 610, the surface environment representation object generation system 212 detects a third input and in response to detecting the third input, the surface environment representation object generation system 212 causes display of a preview interface 214, at operation 612. The third input may, for example, include a motion-based input such as a change of orientation of the client device 102. For example, if the user is pointing the camera of the client device 102 at an upward orientation, the two-dimensional representation of the 2D content is presented in the editing interface 212. If the user changes the orientation of the camera to be facing downward, the surface environment representation object generation system 212 may toggle from displaying the editing interface 212 to displaying the preview interface 214. The preview interface 214 includes a presentation of a surface environment representation object. The surface environment representation object may be rendered at a position in a 2D/3D space captured in the camera feed that is based on a detected reference surface in the 2D/3D space such as a ground or floor surface and based on the input received at operation 606.

At operation 614, the messaging system 100 generates a message that includes one or more images with the surface environment representation object applied. In generating the message, the messaging system 100 may record a video of a user specified or predetermined length (e.g., 3 seconds) that includes one or more images from the camera feed with the surface environment representation object applied. The messaging system 100 may further apply one or more user specified filters to the recorded image(s) in generating the message. The messaging system 100 may also send the surface environment representation object to a second user to enable the second user to place the surface environment representation object in a different real-time camera feed of another environment. This way, the surface environment representation object can be generated using the content item of a first real-world environment and be rendered for display by another user in a second real-world environment.

As shown in the method 700 of FIG. 7, the method 600 may, in some embodiments, include operations 702, 704, 706, 708, and 710. Consistent with these embodiments, the operations 702, 704, 706, 708, and 710 may be performed as part of operation 606 and/or 610 (e.g., as a sub-routine or sub-operation) where the surface environment representation object generation system 210 generates a surface environment representation object from an input virtual object and causes display of a preview interface comprising a presentation of the virtual surface environment representation object within a first or second real-world environment captured within a live or recorded first or second camera feed.

At operation 702, the rendering component 502 captures by a camera of a user device a first image depicting a first environment of the user device. For example, the rendering component 502 activates a rear-facing camera of the user device and presents in full or partial screen real-time images depicting the real-world environment.

At operation 704, the rendering component 502 overlays a first virtual object on a portion of the first image depicting the first environment. For example, the rendering component 502 receives a user selection of a virtual object configured for surface environment representation. The virtual object may be a virtual object configured to present content items from the first environment over which the first virtual object is positioned in a partially or fully transparent manner. In another embodiment, the virtual object may be a virtual object configured to display images received from a second camera feed (e.g., a front or rear facing camera) capturing content items from the first environment. In such cases, the rendering component 502 may identify the region of the virtual object dedicated to displaying the images from the second camera feed. The rendering component 502 may receive user input that manipulates the location and orientation of the virtual object in 2D/3D space relative to the real-time images of the camera feed over which the object is positioned.

At operation 706, the rendering component 502 modifies a surface of the first virtual object using content captured by the user device. For example, in such cases where the object selected is configured to present content from the real-time camera feed in a transparent or partially transparent manner, the rendering component 502 may copy into the pixel values within the border of the virtual object the pixels values of the real-time image portions over which the virtual object is positioned. The border may be opaque or also fully transparent. The pixel values may be copied on a pixels by pixel basis. Specially, the rendering component 502 may determine the 2D/3D position of the virtual object within the real-time image. The rendering component 502 may identify a first pixel position of the virtual object within the real-time image and retrieve the pixel value of the real-time image at the same first pixel position. The rendering component 502 may copy the pixel value of the real-time image at the first pixel position into the first pixel position of the virtual object. The rendering component 502 may continue processing each pixel of the virtual object in the same manner until all the pixel values are updated with the corresponding pixel values over which they are positioned of the real-time images.

In such cases where the virtual object is configured to present content from another camera feed, the rendering component 502 activates the second camera feed and receives and displays images from the second camera feed on the specified portion of the virtual object. Once the rendering component 502 receives a user request to lock the images displayed in the specified portion, the rendering component 502 locks the object and allows the user to manipulate the size, shape, and position of the object that now includes the image last received from the second camera feed prior to the request to lock. The manipulation can be performed while the virtual object is presented on the real-time camera feed received initially.

At operation 708, the rendering component 502 stores a second virtual object comprising the first virtual object with the modified surface. For example, in response to receiving the user request to lock the virtual object, the rendering component 502 maintains in the virtual object the image depicted in a transparent manner the real-world image portion over which the object was positioned just prior to receiving the request to lock the virtual object. As another example, the rendering component 502 locks the object that includes the image last received from the second camera feed prior to the request to lock. The locked virtual object is stored as the second virtual object (e.g., the surface environment representation object).

At operation 710, the rendering component 502 generates for display the second virtual object on a portion of a second image depicting a second environment. For example, the rendering component 502 allows the user to send the second virtual object to a second user for display in a real-time camera feed of the user device of the second user. As another example, the rendering component 502 allows the user to reposition and manipulate the object in the camera feed showing other portions of the first environment.

Figure 8:
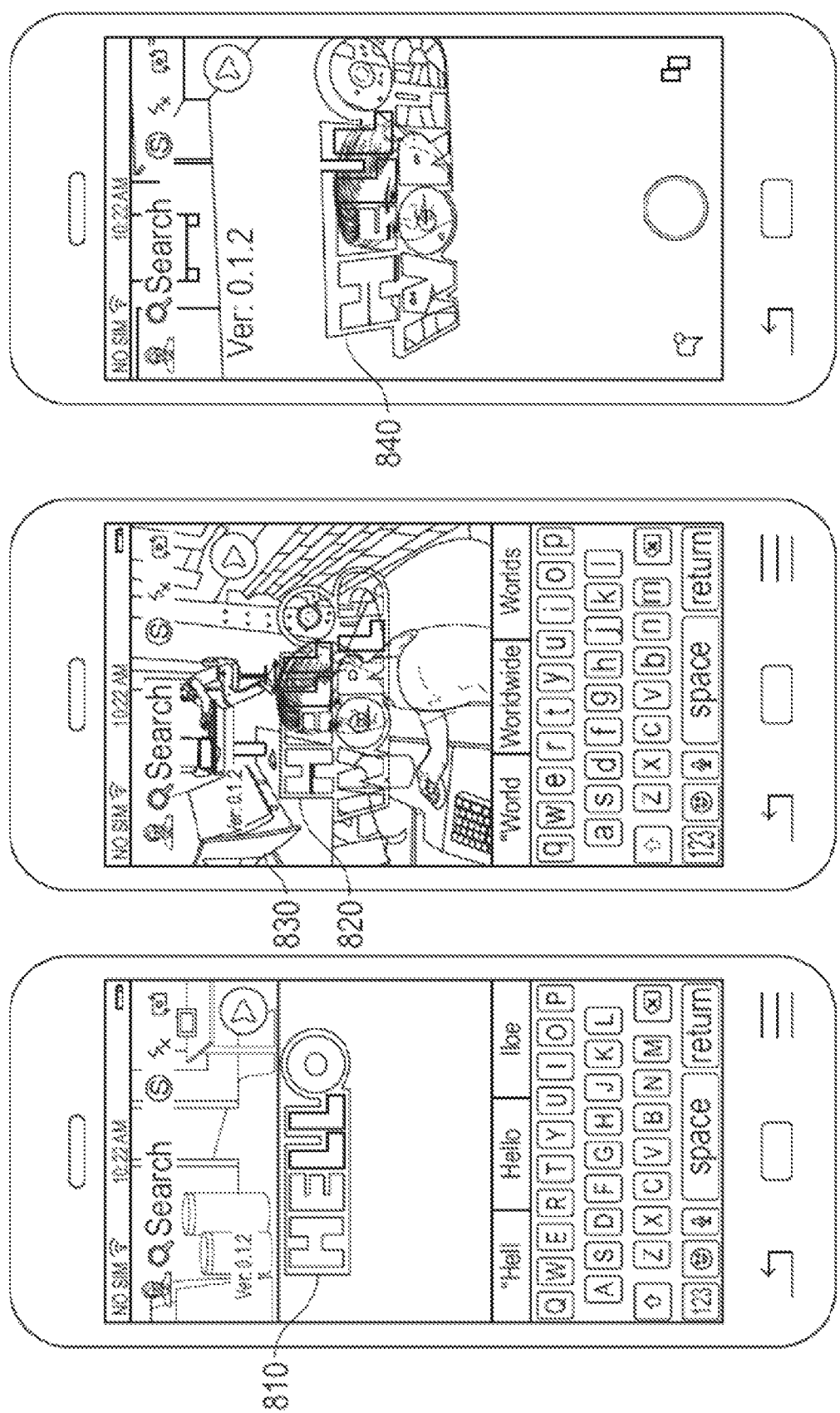

FIGS. 8-12 are interface diagrams that illustrate various interfaces provided by the messaging system, according to some example embodiments. FIG. 8 specifically shows an example of a virtual surface environment representation object being generated within a given environment of a first user device and is moved after being locked to be positioned in a second portion of the given environment of the first user device.

As shown in FIG. 8, a user activates a lens feature of the messaging application allowing a user to add a virtual object to a real-world environment depicted in the real-time images. As an example, the virtual object selected by the user is a 2D caption. In response, the rendering component 502 allows the user to input characters of the 2D caption and as the characters are input the rendering component 502 presents the characters 810 on top of the real-world images received from the real-time camera feed. The rendering component 502 updates surface textures of the characters such that portions of the characters 810 within a border of the caption are at least partially or fully transparent to reveal the underlying real-world images over which the characters are positioned. Namely, the rendering component 502 copies pixel values from the positions of the real-world image portions over which the characters 810 are positioned to the pixels within the border of the characters.

As shown, when characters 810 are positioned over an oak colored desk, the pixels of the characters 810 within the border are updated with the same pixel values of the oak colored desk. As the camera is moved (e.g., is panned right) to show another portion of the real-world environment 830 (e.g., a person working at a desk), the pixels of the characters 810 are updated to show in a transparent manner the portions of the person working at the desk over which the characters are positioned. Characters 820 show the updated pixel values showing that characters 820 are transparent, at least portions within a border of the caption, to reveal the underlying real-world image portions. The rendering component 502 receives a user input to lock the virtual object and create a 3D surface environment representation object, such as to lock the pixel values of the caption to prevent the pixels within the border of the characters from being updated as the virtual object is moved around or as the camera feed changes. Specifically, characters 840 show the locked pixel values and are positioned in 3D space in another portion of the real-world environment (e.g., when the camera is panned left). For example, the characters 840 show the pixel values of the real-world environment 830 (e.g., a person working at a desk, when the camera was panned right) while being positioned in another portion of the real-world environment (e.g., after being panned left) in which the real-world environment 830 is no longer visible.

Figure 9:
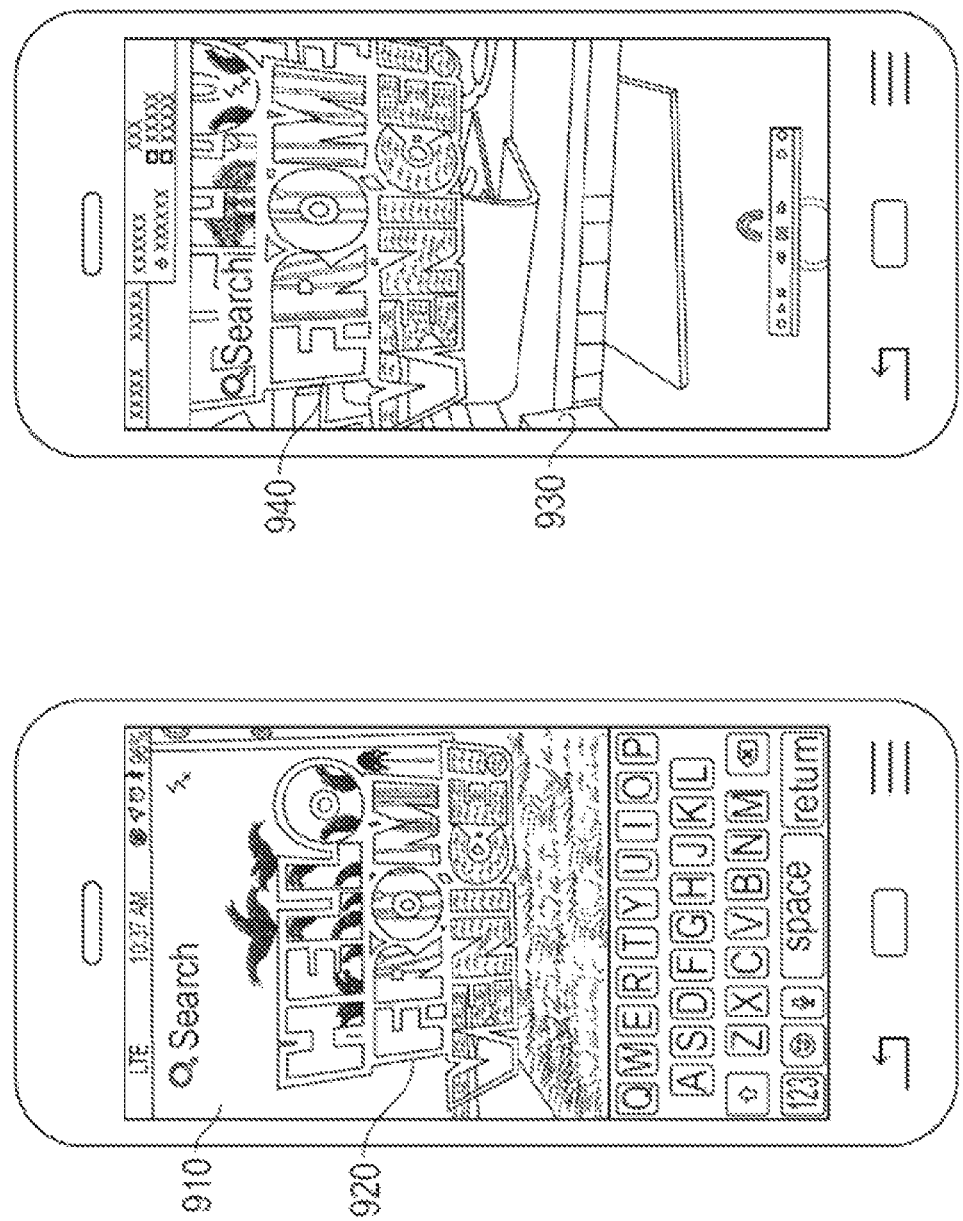

FIG. 9 specifically shows an example of a virtual surface environment representation object being generated within a first environment of a first user device and is sent to a second user device to be positioned and displayed after being locked in a second environment of the second user device. As an example, the virtual object selected by the user is a 2D caption 920. In response, the rendering component 502 allows the user to input characters of the 2D caption 920 and as the characters are input the rendering component 502 presents the characters 920 on top of the real-world images 910 received from the real-time camera feed of the first user device. The rendering component 502 updates surface textures of the characters such that portions of the characters 920 within a border of the caption are at least partially or fully transparent to reveal the underlying real-world images 910 over which the characters are positioned. Namely, the rendering component 502 copies pixel values from the positions of the real-world image portions 910 over which the characters 920 are positioned to the pixels within the border of the characters 920.

The rendering component 502 receives a user input to lock the virtual object and create a 2D surface environment representation object, such as to lock the pixel values of the 2D caption to prevent the pixels within the border of the characters 920 from being updated as the virtual object is moved around, sent to a second user, or as the camera feed changes. Specifically, characters 940 show the locked pixel values and are positioned in 3D space in a second real-world environment 930 after being sent to the second user. For example, the characters 940 show the pixel values of the real-world environment 910 while being positioned in a second real-world environment 930 of a second user device in which the real-world environment 910 is no longer visible.

Figure 10:
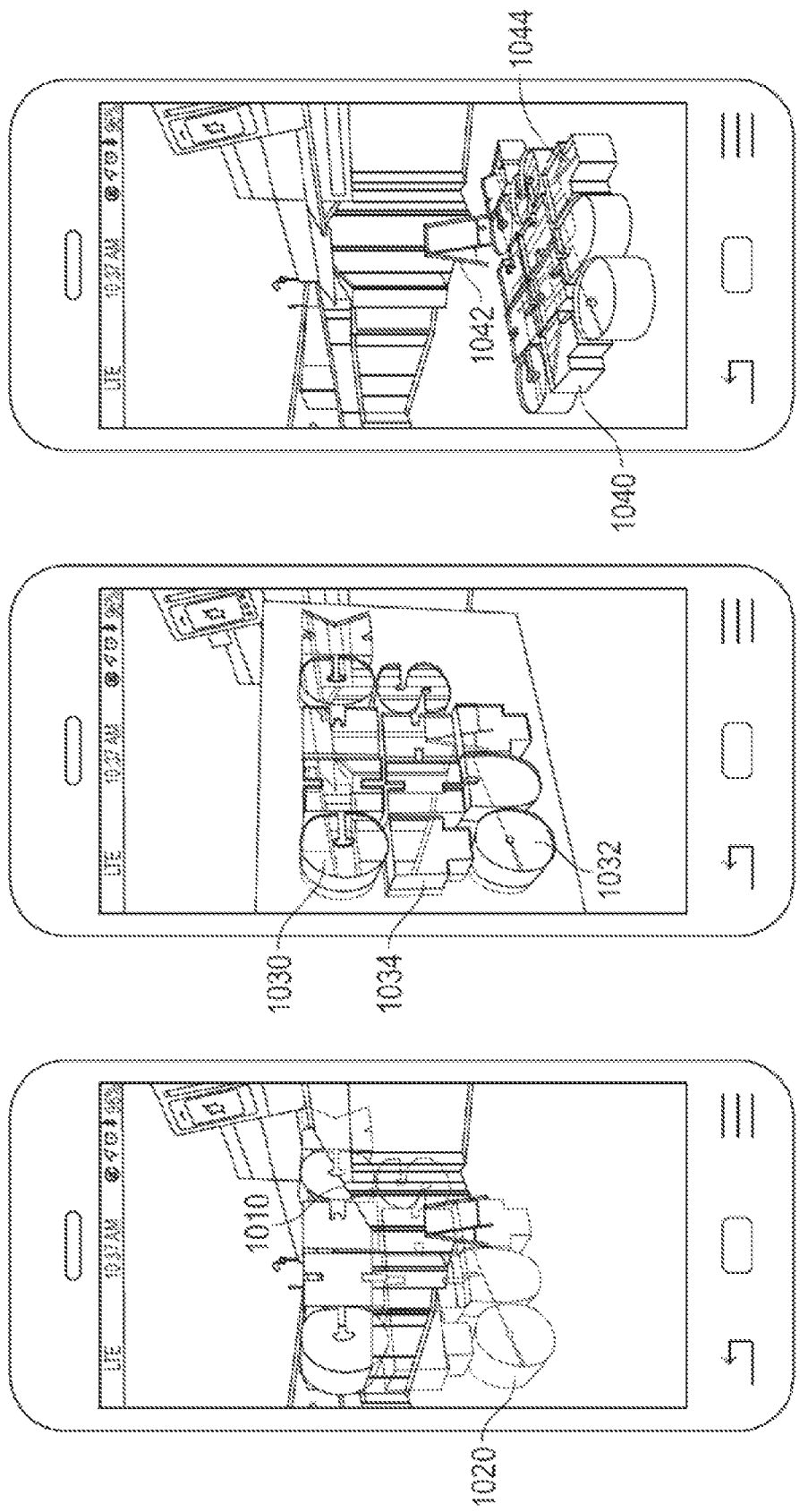

FIG. 10 specifically shows an example of a virtual surface environment representation object being generated within a given environment of a first user device and is re-oriented in 3D space after being locked within the same given environment of the first user device. As shown in FIG. 10, a user activates a lens feature of the messaging application allowing a user to add a virtual object to a real-world environment depicted in the real-time images. As an example, the virtual object selected by the user is a 2D caption. In response, the rendering component 502 allows the user to input characters of the 2D caption 1020 and as the characters are input the rendering component 502 presents the characters 1020 on top of the real-world images 1010 received from the real-time camera feed. The rendering component 502 updates surface textures of the characters 1020 such that portions of the characters 1020 within a border of the caption are at least partially or fully transparent to reveal the underlying real-world images 1010 over which the characters are positioned. Namely, the rendering component 502 copies pixel values from the 2D and 3D positions of the real-world image 1010 portions over which the characters 1020 are positioned to the pixels within the border of the characters.

The rendering component 502 receives a user input to lock the virtual object and create a 3D surface environment representation object, such as to lock the pixel values of the caption to prevent the pixels within the border of the characters from being updated as the virtual object is moved around or as the camera feed changes. In response, the rendering component 502 creates a 3D surface environment representation object 1030 that maintains the current values of a first surface 1032 (e.g., a front surface) of the 3D surface environment representation object (to represent the underlying real-world image portion 1010) and a second surface 1034 (e.g., a perpendicular surface to the first surface in 3D space) is replaced with a single pixel value. This makes 3D surface environment representation object 1030 appear to be coming out of the screen and positioned and oriented in 3D space. The 3D surface environment representation object 1030 can be reoriented in 3D space to appear to lay down on a road as shown by 3D surface environment representation object 1040 being re-oriented in 3D space of the same real-world images 1010. A first surface 1032 of the 3D surface environment representation object 1040 has pixel values of the real-world images 1010 portions over which the object was positioned before being locked and re-oriented over a different portion of the real-world images 1010. As shown, a portion 1042 of the real-world images 1010 (over which a portion of the virtual object was positioned before being locked) is shown in a portion 1044 of the 3D surface environment representation object 1040 (after being locked and re-oriented) even though the 3D surface environment representation object 1040 no longer is positioned on top of the portion 1042.

Figure 11:
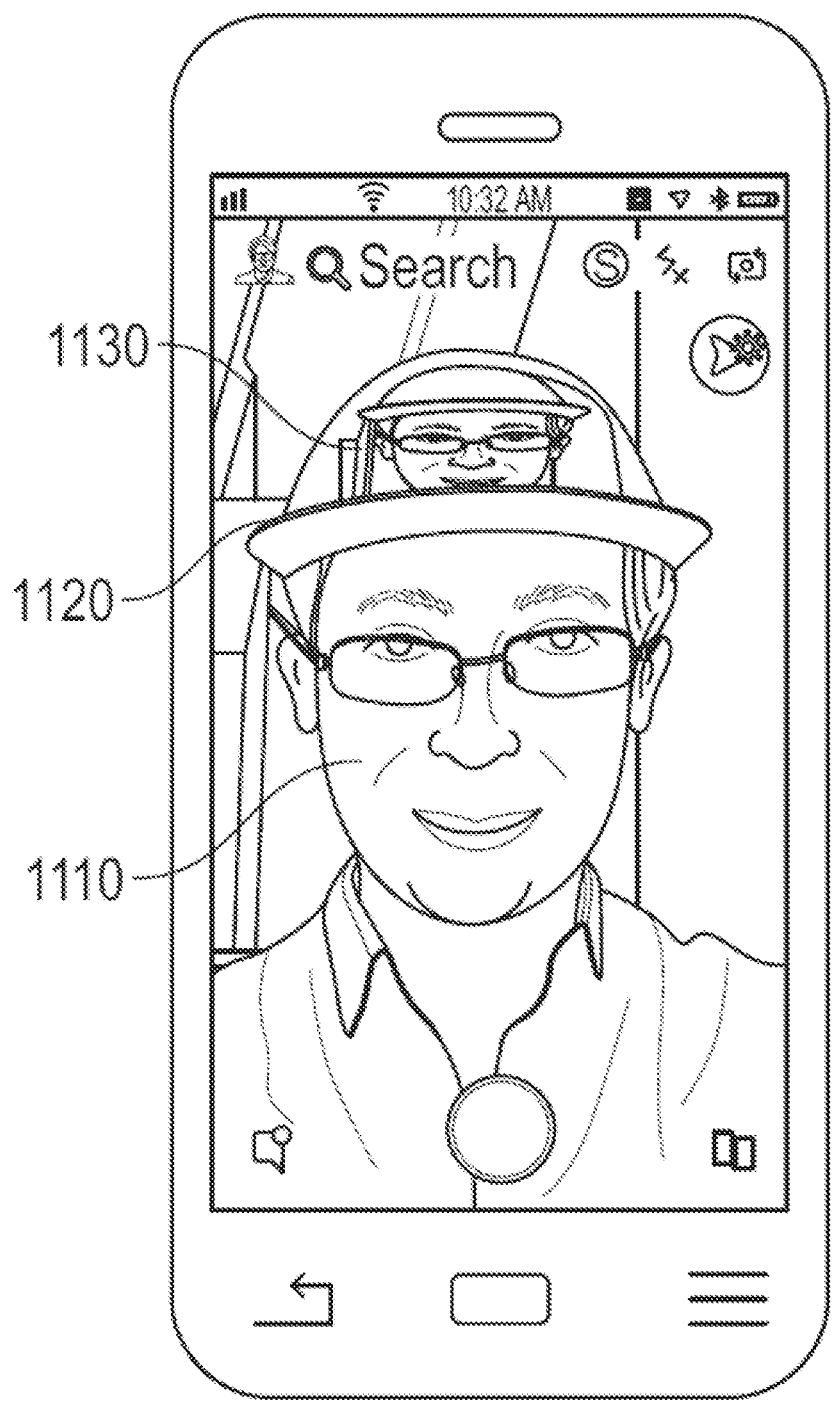

FIG. 11 specifically shows an example 1100 of a virtual surface environment representation object being generated within a given environment of a first user device and is re-oriented in 3D space after being locked within the same given environment of the first user device. As shown in FIG. 11, a user activates a lens feature of the messaging application allowing a user to add a virtual object 1120 to a real-world environment depicted in the real-time images 1110. As an example, the virtual object selected by the user is a virtual hat 1120. In response, the rendering component 502 allows the user to position the virtual hat in 2D/3D space on top of the real-world images 1110 (e.g., a person's head) received from a first real-time camera feed. The rendering component 502 identifies a portion 1130 of the virtual object 1120 which is configured to present content from a second real-time camera feed. The rendering component 502 activates a second camera (e.g., selected by the user as the front or rear facing camera), receives real-time images from the second camera and presents those images from the second camera on the portion 1130 of the virtual object 1120. In this way, multiple camera feeds are shown in example 1100, such that the virtual object 1120 is positioned over images from a first camera feed and images from a second camera feed are placed on a portion of the virtual object. In some embodiments, rather than activating a second camera feed, the rendering component 502 allows a user to select an image, video or animation, to insert into the portion 1130. In such cases, one camera feed is utilized, such that the virtual object 1120 is positioned over images from the camera feed and an image, video or animation selected by the user is placed on a dedicated or user-selectable portion 1130 of the virtual object 1120.

Figure 12A:
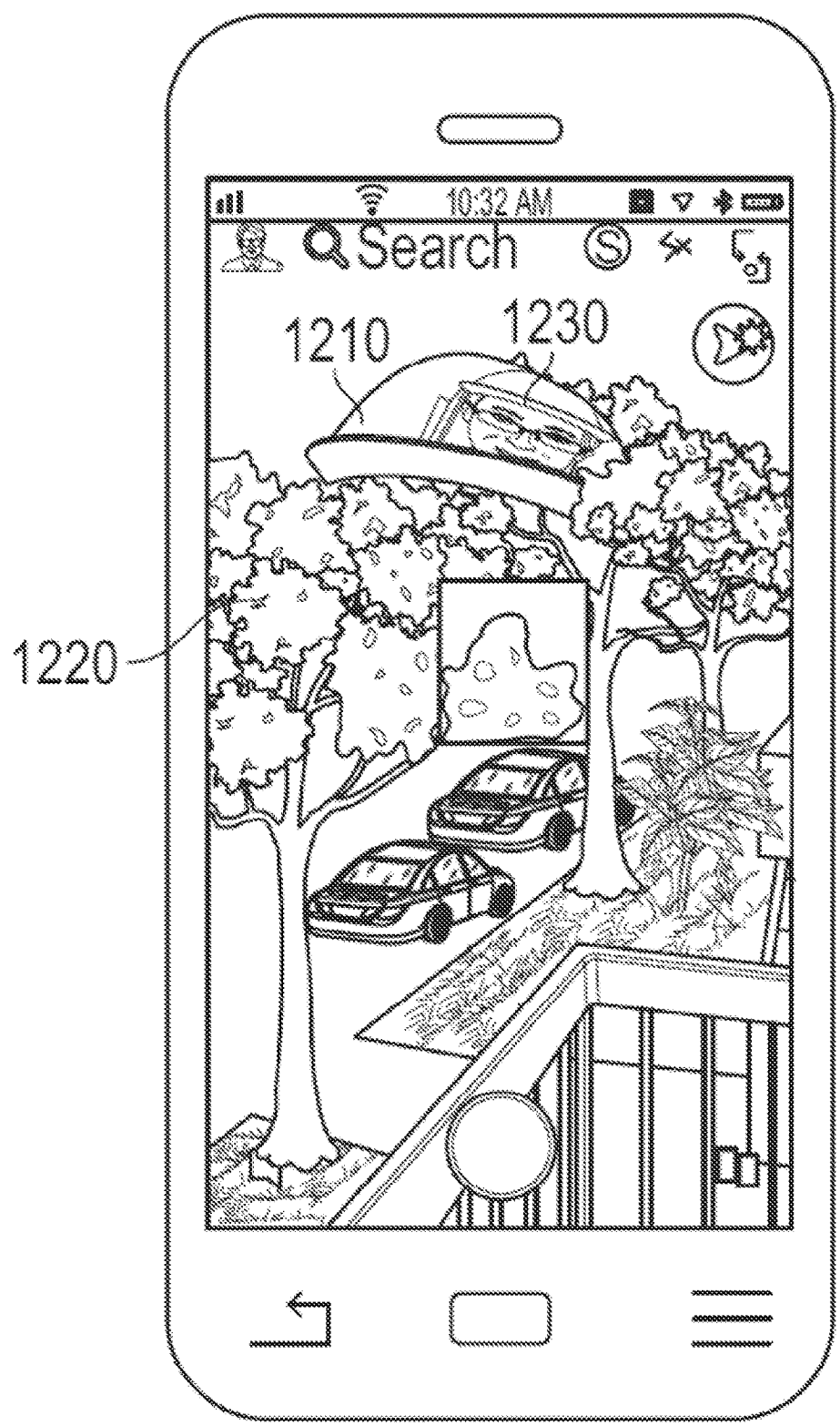

As shown in FIG. 12A, the rendering component 502 receives a user input to lock the virtual object 1120, such as to lock the pixel values of the virtual object 1120 to prevent the pixels from being updated with the second camera feed or with the selected image, video or animation as the virtual object 1120 is moved around or as the first camera feed changes. In response, the rendering component 502 creates a surface environment representation object 1210 that maintains the current values of a portion 1230 (e.g., a front surface of the virtual hat) as the surface environment representation object 1210 is moved around or as the camera feed changes. Specifically, portion 1230 shows the locked pixel values of the surface environment representation object 1210 and do not change as the surface environment representation object 1210 is positioned in 3D space in another portion of the real-world environment 1220 (e.g., when the camera is panned left).

Figure 12B:
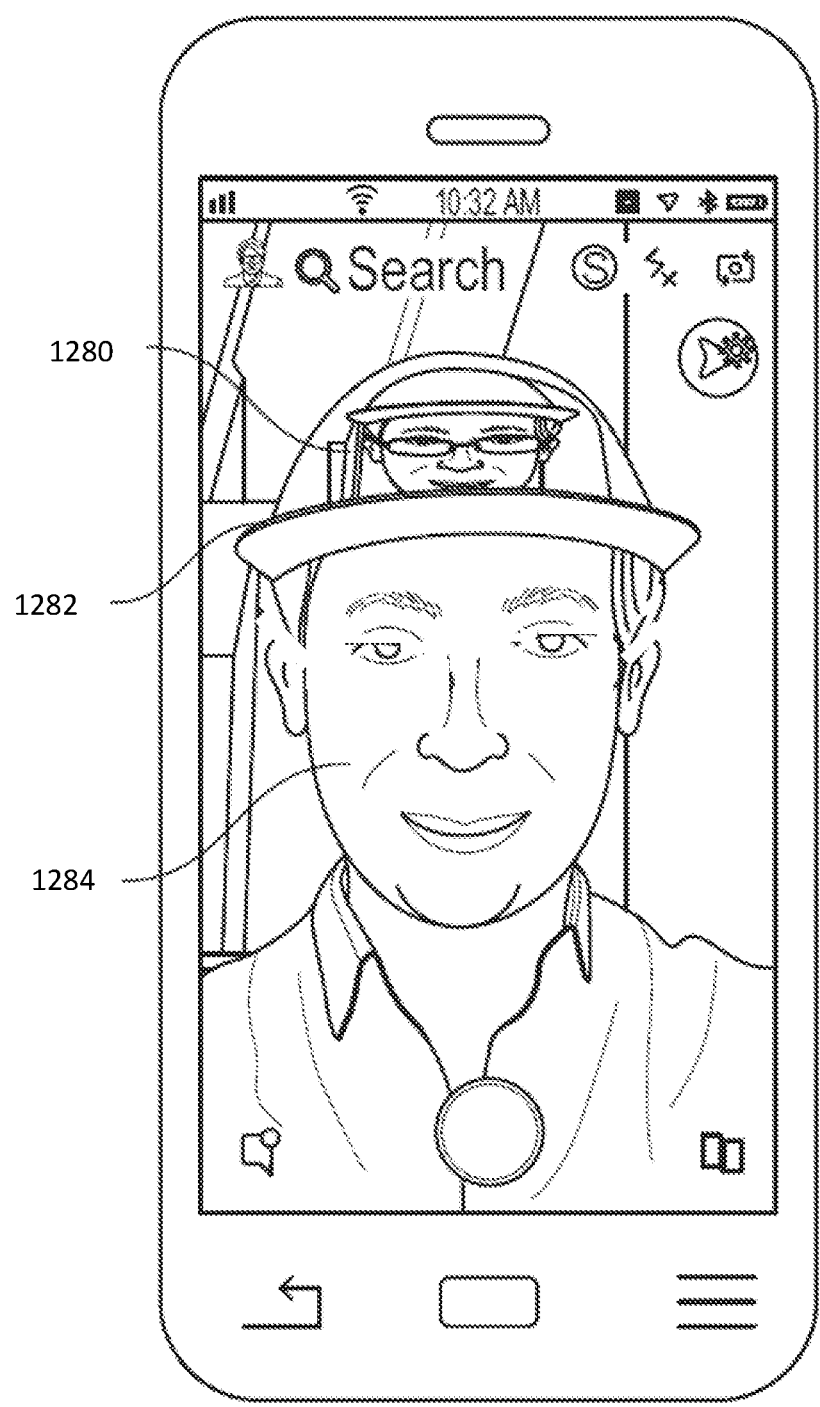

In some embodiments, the virtual object 1120 displayed on the first user device is sent in a message to a second user device. FIG. 12B shows the virtual object 1120, created by the first user device, being received by a second user device. The second user device may be operated by a second user and may present real-time images from a camera feed of the second user device. In FIG. 12B, the real-time camera feed presents a face 1284 of the second user. The virtual object 1120, which may be a virtual hat, may be positioned as virtual object 1282 on top of the head of the second user, as shown in FIG. 12B. Any image, video or animation, that was inserted by the first user device into the portion of the virtual object is also presented in the portion 1280 of the virtual object 1282. In this way, a first user may create a virtual object which is presented on a first user device, as shown in FIG. 11. The first user device may present the virtual object as being worn by the first user. The first user may send the created virtual object to a second user. As shown in FIG. 12B, a second user device of second user may present the received virtual object to the second user and may position the virtual object to make it appear as though the virtual object is also being worn by the second user.

Figure 13:
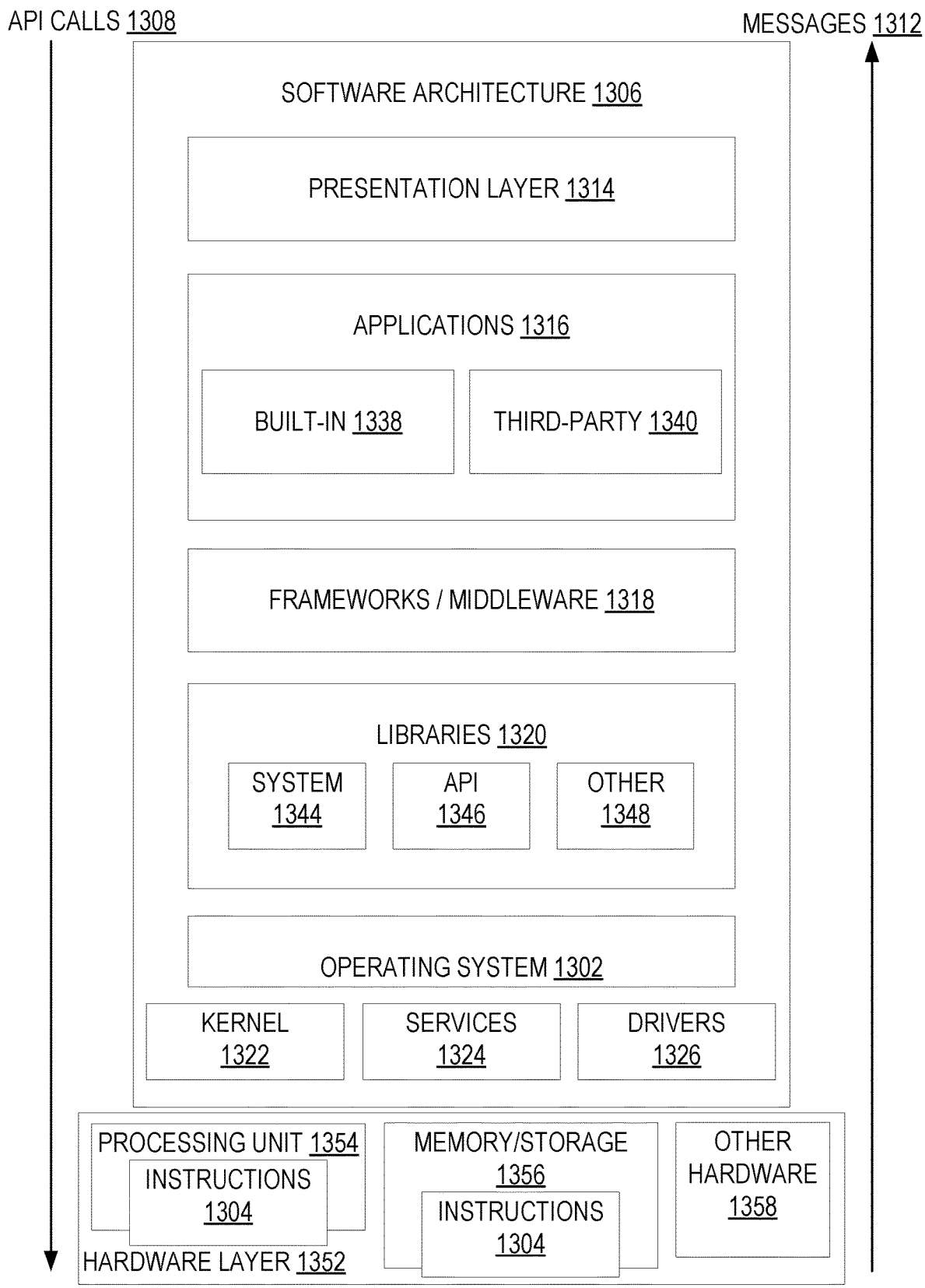
FIG. 13 is a block diagram illustrating a representative software architecture, which may be used in conjunction with various hardware architectures herein described, according to example embodiments.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1300 of FIG. 13 that includes, among other things, processors 1304, memory 1314, and input/output (I/O) components 1319. A representative hardware layer 1352 is illustrated and can represent, for example, the machine 1300 of FIG. 13. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316, frameworks/middleware 1318, and a presentation layer 1314. Operationally, the applications 1316 and/or other components within the layers may invoke API calls 1308 through the software stack and receive a response 1312 as in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/ component "logic" can be separated from the aspects of the application/component that interact with a user.

Figure 14:
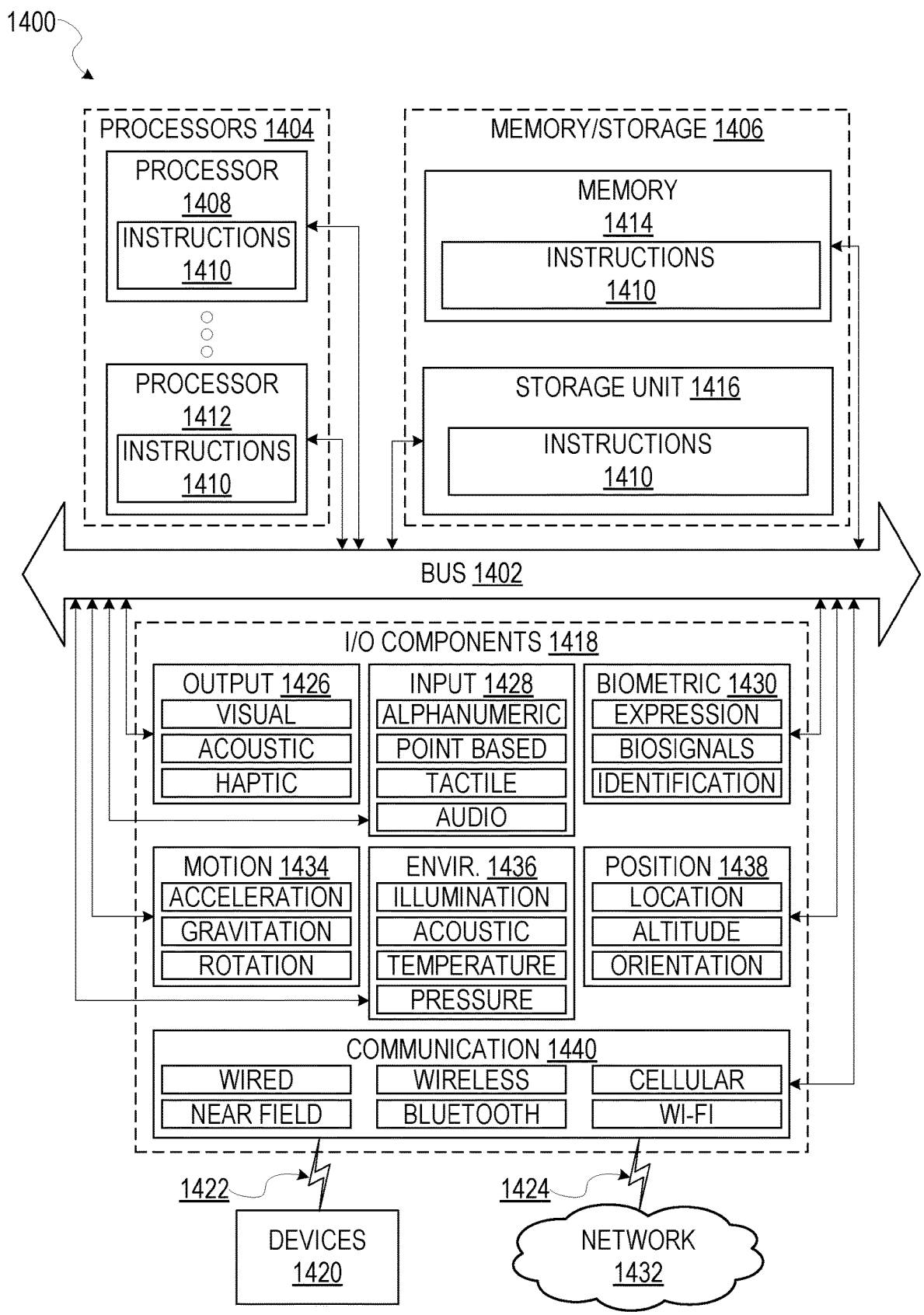
FIG. 14 is a block diagram illustrating components of a machine able to read instructions from a machine-readable medium (e.g., a machine-readable storage medium) and perform any one or more of the methodologies discussed herein, according to example embodiments.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. In an example embodiment, the processors 1404 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1408 and a processor 1412 that may execute the instructions 1410. The term "processor" is intended to include multi-core processors 1404 that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiple cores, or any combination thereof.

The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1424 and coupling 1422, respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    accessing, by a camera of a user device, a first image depicting a first environment of the user device;
    overlaying, by one or more processors, a virtual garment on a portion of the first image depicting the first environment; and
    generating, responsive to each character in user input, a three-dimensional caption that includes a surface modified to represent one or more visual components of the first environment depicted in the first image.

2. The method of claim 1, further comprising:
detecting a surface orientation of a surface of the first environment depicted in the first image over which the virtual garment is overlaid; and
modifying an orientation of text of the virtual garment to match the surface orientation of the surface of the first environment depicted in the first image.

3. The method of claim 1, wherein the virtual garment is displayed within a camera feed captured using an application of the user device.

4. The method of claim 1, wherein the virtual garment is stored in response to receiving input confirming a position of the virtual garment in the first image.

5. The method of claim 1, wherein the user device is a first user device, and further comprising sending the virtual garment to a second user device via an application of the first user device.

6. The method of claim 1, the user device comprising a first user device, wherein a second image depicting a second environment is captured by a second user device, and further comprising:
receiving the virtual garment from the first user device; and
causing display of the virtual garment on a portion of the second image depicting the second environment.

7. The method of claim 1 further comprising:
receiving user input comprising a plurality of characters of a string.

8. The method of claim 1, wherein:
modifying the surface of the virtual garment comprises presenting a second video on the virtual garment.

9. The method of claim 8, further comprising:
causing capturing a third video using a camera of a second user device; and
presenting the virtual garment with the second video on top of the third video on the second user device.

10. The method of claim 1, wherein the camera of the user device comprises a front-facing camera of the user device, wherein the first image is a first of a plurality of images of a first video captured by the front-facing camera of the user device, wherein a body part of a user is captured by the front-facing camera, and further comprising:
displaying the virtual garment depicting the body part of the user captured by the front-facing camera within a second video captured by a rear-facing camera of the user device.

11. The method of claim 1, wherein the virtual garment comprises a virtual hat that is positioned on top of a head of a user depicted in the first image.

12. A system comprising:
one or more processors; and
a memory storing instructions which, when executed by the one or more processors, cause the one or more processors to perform operations comprising:
accessing, by a camera of a user device, a first image depicting a first environment of the user device;
overlaying, by one or more processors, a virtual garment on a portion of the first image depicting the first environment; and
generating, responsive to each character in user input, a three-dimensional caption that includes a surface modified to represent one or more visual components of the first environment depicted in the first image.

13. The system of claim 12, wherein the operations further comprise:
detecting a surface orientation of a surface of the first environment depicted in the first image over which the virtual garment is overlaid; and
modifying an orientation of text of the virtual garment to match the surface orientation of the surface of the first environment depicted in the first image.

14. The system of claim 12, wherein the virtual garment is displayed within a camera feed captured using an application of the user device.

15. The system of claim 12, wherein the virtual garment is stored in response to receiving input confirming a position of the virtual garment in the first image.

16. The system of claim 12, wherein the user device is a first user device, and further comprising sending the virtual garment to a second user device via an application of the first user device.

17. The system of claim 12, wherein the virtual garment comprises a virtual hat that is positioned on top of a head of a user depicted in the first image.

18. A non-transitory machine-readable medium storing non-transitory instructions which, when executed by one or more processors of a machine, cause the machine to perform operations comprising:
accessing, by a camera of a user device, a first image depicting a first environment of the user device;
overlaying, by one or more processors, a virtual garment on a portion of the first image depicting the first environment; and
generating, responsive to each character in user input, a three-dimensional caption that includes a surface modified to represent one or more visual components of the first environment depicted in the first image.

19. The non-transitory machine-readable medium of claim 18, wherein the operations further comprise:
detecting a surface orientation of a surface of the first environment depicted in the first image over which the virtual garment is overlaid; and
modifying an orientation of text of the virtual garment to match the surface orientation of the surface of the first environment depicted in the first image.

20. The non-transitory machine-readable medium of claim 18, wherein the virtual garment comprises a virtual hat that is positioned on top of a head of a user depicted in the first image.

* * * * *

UNITED STATES PATENT AND TRADEMARK OFFICE
CERTIFICATE OF CORRECTION

PATENT NO. : 12,211,159 B2
APPLICATION NO. : 18/380577
DATED : January 28, 2025
INVENTOR(S) : Hare et al.

Page 1 of 1

It is certified that error appears in the above-identified patent and that said Letters Patent is hereby corrected as shown below:

On the Title Page

On page 9, in Column 1, under item (56), "Other Publications", Line 14, delete "toOffice" and insert --to Office-- therefor Signed and Sealed this
Twenty-sixth Day of August, 2025

Coke Morgan Stewart
*Acting Director of the United States Patent and Trademark Office*